(12) United States Patent
Burdette et al.

(10) Patent No.: US 12,390,696 B2
(45) Date of Patent: Aug. 19, 2025

(54) GOLF BALL DISPENSER WITH EMBEDDED DISPLAY DEVICE, SEPARATE FRONT WATERFALL PANEL AND/OR BLOWER ASSEMBLY

(71) Applicant: Topgolf International, Inc., Dallas, TX (US)

(72) Inventors: Brian David Burdette, McKinney, TX (US); Andrew David Macaulay, Dallas, TX (US); Clinton Scott Lovejoy, Dallas, TX (US); William Kevin Miner, Frisco, TX (US); Theodore YuChiang Cheng, San Francisco, CA (US); Mark Joseph Semsak, Des Plaines, IL (US); Gabriel Heath Denk, Wylie, TX (US); Justin Dean Pendleton, The Colony, TX (US); Brian Lee Roderman, Plano, TX (US); David Christopher Singer, Austin, TX (US); Clifton Frederick Geisler, McKinney, TX (US); Scott Michael Thibeault, Redwood City, CA (US); Frances Meng Wang, San Francisco, CA (US); Michael Ryan Petri, Carrollton, TX (US); Kenneth John Buras, Jr., Durango, CO (US)

(73) Assignee: Topgolf International, Inc., Dallas, TX (US)

( * ) Notice: Subject to any disclaimer, the term of this patent is extended or adjusted under 35 U.S.C. 154(b) by 0 days.

(21) Appl. No.: 18/657,477

(22) Filed: May 7, 2024

(65) Prior Publication Data

US 2024/0293703 A1  Sep. 5, 2024

Related U.S. Application Data

(63) Continuation of application No. 17/699,020, filed on Mar. 18, 2022, which is a continuation-in-part of application No. PCT/US2020/051607, filed on Sep. 18, 2020.

(60) Provisional application No. 62/902,902, filed on Sep. 19, 2019.

(51) Int. Cl.
A63B 47/00 (2006.01)
A63B 24/00 (2006.01)
(Continued)

(52) U.S. Cl.
CPC ........ *A63B 47/002* (2013.01); *A63B 24/0003* (2013.01); *A63B 71/0622* (2013.01);
(Continued)

(58) Field of Classification Search
CPC .............. A63B 43/007; A63B 43/0003; A63B 2024/0028; A63B 2024/0031;
(Continued)

(56) References Cited

U.S. PATENT DOCUMENTS 3,075,774 A * 1/1963 Buell ................. A63B 57/0006
  473/137
3,248,008 A * 4/1966 Meierjohan ............ A63B 69/40
  221/205
(Continued)

FOREIGN PATENT DOCUMENTS

CN 202590298 12/2012
CN 206239993 6/2017
(Continued)

OTHER PUBLICATIONS

U.S. Appl. No. 29/706,400, filed Sep. 19, 2019, Burdette et al.
(Continued)

*Primary Examiner* — Joseph B Baldori
(74) *Attorney, Agent, or Firm* — Fish & Richardson P.C.

(57) ABSTRACT

A system includes: a golf range; targets on the golf range; a building including golf bays including golf ball dispensers,
(Continued)

each including a receptacle, a passageway, a gateway, and a display device embedded in the golf ball dispenser; at least one golf ball sensor; one or more computers communicatively coupled with the at least one golf ball sensor and the golf ball dispensers, the one or more computers being configured to track a golf ball in flight on the golf range, identify where the golf ball lands on the golf range, identify the golf bay from which the golf ball was hit, and present information, regarding the golf ball hit from the golf bay, on the display device of the golf ball dispenser associated with the golf bay, the information being in accordance with where the golf ball lands on the golf range.

23 Claims, 21 Drawing Sheets

(51) Int. Cl.
  A63B 71/06 (2006.01)
  A63B 102/32 (2015.01)
  G06F 3/041 (2006.01)
  G06V 40/16 (2022.01)
(52) U.S. Cl.
  CPC ............ *G06F 3/041* (2013.01); *G06V 40/172* (2022.01); *A63B 2071/0638* (2013.01); *A63B 2102/32* (2015.10); *A63B 2209/14* (2013.01); *A63B 2220/05* (2013.01); *A63B 2220/806* (2013.01); *A63B 2225/20* (2013.01); *A63B 2225/54* (2013.01); *A63B 2225/74* (2020.08)
(58) Field of Classification Search
  CPC ........ A63B 2024/0034; A63B 71/0619; A63B 71/0622; A63B 71/0636; A63B 71/0638; A63B 2102/32; A63B 2220/05; A63B 2220/806
  USPC ....... 473/150, 151, 152, 153, 154, 155, 156, 473/157, 159, 168, 169, 170, 195, 196, 473/404
  See application file for complete search history.

(56) References Cited

U.S. PATENT DOCUMENTS

| | | | |
|---|---|---|---|
| 4,773,114 A * | 9/1988 | Thrasher | A63B 47/04 15/3.16 |
| 5,014,985 A * | 5/1991 | Capps | A63B 47/04 15/21.2 |
| 5,210,603 A * | 5/1993 | Sabin | G07F 17/28 348/157 |
| 5,529,307 A | 6/1996 | Chang | |
| 5,673,812 A | 10/1997 | Nelson | |
| 5,833,091 A | 11/1998 | Palmer | |
| 5,931,317 A | 8/1999 | Zusack et al. | |
| 5,931,609 A | 8/1999 | Sickles | |
| D416,971 S | 11/1999 | Yates | |
| 5,993,322 A | 11/1999 | Consalvi | |
| 5,996,839 A | 12/1999 | Mclinn | |
| D420,706 S | 2/2000 | Weatherby et al. | |
| 6,129,242 A | 10/2000 | Chan | |
| 6,179,719 B1 | 1/2001 | Hwang | |
| 6,199,926 B1 | 3/2001 | Lemoine | |
| D445,858 S | 7/2001 | Yates | |
| 6,287,212 B1 | 9/2001 | Wetherell et al. | |
| 6,328,659 B1 | 12/2001 | Peterson | |
| 6,368,229 B1 | 4/2002 | Wetherell | |
| 6,375,580 B1 | 4/2002 | Schmidt et al. | |
| 6,386,607 B1 | 5/2002 | Deininger | |
| 6,419,589 B1 | 7/2002 | Carter | |
| 6,419,600 B1 | 7/2002 | York et al. | |
| 6,523,718 B1 | 2/2003 | Chan | |
| 6,569,028 B1 | 5/2003 | Nichols et al. | |
| 6,607,123 B1 | 8/2003 | Jollifee et al. | |
| 6,631,828 B1 | 10/2003 | Reardon | |
| 6,739,477 B1 | 5/2004 | Pascual | |
| 6,880,542 B1 * | 4/2005 | Johndreau | F41A 9/03 124/78 |
| 6,893,356 B2 | 5/2005 | Thompson | |
| 6,942,578 B2 | 9/2005 | Adolf | |
| 6,997,816 B2 | 2/2006 | Gager | |
| 7,037,207 B1 | 5/2006 | Bean, Jr. | |
| 7,086,561 B2 | 8/2006 | Bosanac | |
| 7,118,105 B2 | 10/2006 | Benevento | |
| 7,166,034 B2 | 1/2007 | Hines et al. | |
| 7,186,186 B2 | 3/2007 | Imahata | |
| 7,318,777 B1 | 1/2008 | Sells | |
| 7,506,781 B2 | 3/2009 | Roberts | |
| 7,704,165 B2 | 4/2010 | Pommereau | |
| 7,712,752 B2 * | 5/2010 | Horning | A47B 81/00 280/652 |
| 7,913,840 B2 | 3/2011 | Kealy | |
| 8,061,557 B1 | 11/2011 | Torrance | |
| 8,162,173 B2 | 4/2012 | Pommereau | |
| 8,505,771 B2 | 8/2013 | Read | |
| 8,781,623 B2 | 7/2014 | Leech et al. | |
| 9,038,821 B2 | 5/2015 | Proulx | |
| 9,132,326 B2 | 9/2015 | Caster et al. | |
| 9,199,153 B2 | 12/2015 | Dawe et al. | |
| 9,283,464 B2 * | 3/2016 | Nipper | A63B 24/0021 |
| 9,339,697 B2 | 5/2016 | Luciano et al. | |
| 9,669,274 B1 | 6/2017 | Renkis | |
| 9,782,639 B2 * | 10/2017 | Kettler | A47B 25/003 |
| 9,993,696 B2 | 6/2018 | Hogan | |
| 10,001,563 B2 * | 6/2018 | Schauermann | G06Q 10/0639 |
| 10,118,074 B2 * | 11/2018 | Kettler | A63B 47/002 |
| 10,463,923 B1 | 11/2019 | Luciano et al. | |
| 10,493,329 B1 * | 12/2019 | Luciano, Jr. | A63B 37/0003 |
| 10,639,529 B1 * | 5/2020 | Luciano, Jr. | A63B 60/46 |
| 11,027,193 B2 * | 6/2021 | Tawwater | A63F 13/245 |
| 11,786,810 B2 * | 10/2023 | Tawwater | A63F 13/573 463/3 |
| 2007/0167251 A1 | 7/2007 | Pathross et al. | |
| 2007/0234610 A1 * | 10/2007 | Pelak | G09F 15/0043 40/567 |
| 2008/0242437 A1 | 10/2008 | Taylor | |
| 2009/0128729 A1 | 5/2009 | Dunn | |
| 2009/0129021 A1 | 5/2009 | Dunn | |
| 2010/0232107 A1 | 9/2010 | Dunn | |
| 2013/0274025 A1 | 10/2013 | Luciano et al. | |
| 2014/0334100 A1 | 11/2014 | Yoon et al. | |
| 2016/0001158 A1 * | 1/2016 | Tawwater | A63B 24/0003 463/3 |
| 2016/0220873 A1 * | 8/2016 | Mitchell | A63B 47/002 |
| 2016/0287967 A1 * | 10/2016 | Baldwin | A63B 69/3623 |
| 2016/0361617 A1 | 12/2016 | Luciano, Jr. | |
| 2018/0326263 A1 * | 11/2018 | Rausch | G01L 17/005 |
| 2020/0054925 A1 | 2/2020 | Rosamino | |
| 2021/0135491 A1 | 5/2021 | Dagher et al. | |
| 2022/0203178 A1 | 6/2022 | Burdette et al. | |

FOREIGN PATENT DOCUMENTS

| | | |
|---|---|---|
| GB | 9318774 | 10/1993 |
| GB | 2270474 | 3/1994 |
| JP | 10126713 A | 5/1998 |
| KR | 20070070675 A | 7/2007 |

OTHER PUBLICATIONS

[No Author Listed] [online]. "Golf Ball Auto Tee up Driving Range," Jan. 2016, retrieved on Sep. 20, 2019, <https://www.youtube.com/watch?v=VLbf843oWnE>, 2 pages.

BigShotsGolf.com [online], "Open a bigshots—bigshots golf—empowering golf entertainment," upon information and belief, available no later than Sep. 19, 2019, retrieved on Sep. 20, 2019, retrieved from URL <https://www.bigshotsgolf.com/open-a-bigshots/>, 13 pages.

(56) References Cited

OTHER PUBLICATIONS eBay.com [online], "Powerless electricity-less golfball dispenser golf ball automatic machine green," upon information and belief, available no later than Sep. 19, 2019, retrieved on Sep. 20, 2019, retrieved from URL <https://www.ebay.com/itm/Powerless-Electricity-Less-Golfball-Dispenser-Golf-ball-Auto>, 3 pages.
Extended European Search Report in European Appln No. 20865920.1, dated Sep. 16, 2022, 7 pages.
Google.com [online], "Auto tee-up with golf ball hopper, korea, 30 bays," upon information and belief, available no later than Sep. 19, 2019, retrieved on Sep. 20, 2019, retrieved from URL <https://www.google.com/blank.html, Sep. 20, 2019>, 1 page.
IndustrialUltrasonicCleaner.sell.everychina.com [online], "Full automatic golf ball dispenser for driving range / club fitting and testing," upon information and belief, available no later than Sep. 19, 2019, retrieved on Sep. 20, 2019, retrieved from URL <http://industrialultrasoniccleaner.sell.everychina.com>, 5 pages.
International Search Report and Written Opinion in International Appln. No. US2020/051607, dated Dec. 3, 2020, 9 pages.
Office Action in Australian Appln. No. 2022201644, dated Feb. 3, 2023, 4 pages.
Office Action in Chinese Appln. No. 202080065509.8, dated Feb. 18, 2023, 15 pages (with English translation).
Office Action in Chinese Appln. No. 202080065509.8, dated Jul. 15, 2023, 10 pages (with English translation).
Office Action in Chinese Appln. No. 202080065509.8, dated Nov. 1, 2023, 9 pages (with English translation).
Office Action in European Appln. No. 20865920.1, dated Dec. 5, 2023, 58 pages.
Office Action in European Appln. No. 20865920.1, dated May 31, 2023, 7 pages.
RangeServant.us [online], "GL-8 golf ball dispenser—range servant america," upon information and belief, available no later than Sep. 19, 2019, retrieved on Sep. 20, 2019, retrieved from URL <https://rangeservant.us/product/gl-8-golf-ball-dispenser/>, 3 pages.
TripAdvisor.com [online] "The ball dispenser for the players—picture of topgolf Loudoun, Ashburn," upon information and belief, available no later than Sep. 19, 2019, retrieved on Sep. 20, 2019, retrieved from URL <https://www.tripadvisor.com/LocationPhotoDirectLink>, 2 pages.
TripAdvisor.com [online], "Ball Dispenser—Picture of TopGolf Austin," upon information and belief, available no later than Sep. 19, 2019, retrieved on Sep. 20, 2019, retrieved from URL <https://en.tripadvisor.com.hk/LocationPhotoDirectLink>, 2pages.
Extended European Search Report in European Appln No. 24169887.7, dated Jul. 3, 2024, 7 pages.
Office Action in Chinese Appln. No. 202310272066.5, dated May 28, 2025, 17 pages (with English translation).

\* cited by examiner

GOLF BALL DISPENSER WITH EMBEDDED DISPLAY DEVICE, SEPARATE FRONT WATERFALL PANEL AND/OR BLOWER ASSEMBLY

CROSS-REFERENCE TO RELATED APPLICATIONS

This application is a continuation of U.S. patent application Ser. No. 17/699,020 filed on Mar. 18, 2022, which is a continuation-in-part application of PCT/US2020/051607, filed Sep. 18, 2020, and published on Mar. 25, 2021 as WO 2021/055832, which claims the benefit of priority to U.S. Patent Application No. 62/902,902, entitled "GOLF BALL DISPENSER WITH EMBEDDED DISPLAY DEVICE", filed Sep. 19, 2019, which is hereby incorporated by reference.

BACKGROUND

This specification relates to apparatus for holding golf balls and for controllably dispensing a single golf ball at a time for use in a golf game.

Many apparatus for delivering golf balls to facilitate playing golf have been produced over the years. For example, U.S. Pat. No. 6,129,242 to Chan describes a ball dispensing apparatus including a container to house golf balls and a gate member to allow selective control of the dispensation of a single golf ball, without requiring the golfer to alter his or her stance prior to each swing or putt. U.S. Pat. No. 6,607,123 to Jolliffee et. al. describes a golf driving range in which golf balls are delivered to golfers using an automatic tee device that reads a radio frequency identification (RFID) tag in the golf ball to identify the golf ball so as to match the ball to the player at the tee area. In addition, U.S. Pat. No. 9,132,326 to Caster et. al. mentions a golf ball delivery device that sits next to a tee area in a golf bay and includes an RFID reader to identify RFID equipped golf balls after triggering of a ball release mechanism and a light emitting diode (to alert the player that the golf ball is coming) in response to the golfer waiving his or her club in front of a proximity sensor located in the golf ball delivery device. Moreover, some golf ranges have provided display devices near tee areas for use in displaying information about a golf shot derived from sensors that detect the golf ball in flight.

SUMMARY

This specification describes systems and techniques relating to holding and dispensing golf balls at a golf facility, e.g., a driving range. In general, one or more aspects of the subject matter described in this specification can be embodied in a golf ball dispenser including: a receptacle configured to hold multiple golf balls; a passageway connecting an outlet of the golf dispenser with the receptacle; a gateway coupled between the passageway and the receptacle to restrict a passage of the multiple golf balls into the passageway, the gateway being selectively moveable to allow a golf ball to pass into the passageway for delivery to a tee area; and a display device embedded in the golf ball dispenser to present at least information regarding the golf ball in flight after the golf ball is hit from the tee area. Further, one or more aspects of the subject matter described in this specification can be embodied this golf ball dispenser and optionally include one or more of the following features.

A golf ball dispenser can include: a metal frame that holds the receptacle, the passageway, and the gateway, wherein the metal frame defines at least one recess configured to receive the display device in an angled top portion of the golf ball dispenser; a gasket positioned over the display device in the angled top portion of the golf ball dispenser; and an impact resistant shield positioned over the gasket and over the display device in the angled top portion of the golf ball dispenser.

A golf ball dispenser can include a front panel and a back panel, each of the front panel and the back panel including: a first piece having reinforcing ribs and a first strength derived at least in part from the reinforcing ribs, the first piece being configured to attach with the metal frame; a second piece configured to cover and attach with the first piece, the second piece having a second strength less than the first strength, and the second piece including two distinct foam materials.

A golf ball dispenser can include a top panel, a left side panel, and a right side panel; wherein the front panel, the left side panel, the right side panel, the back panel, and the top panel include tongues and grooves to interlock the panels together about the frame.

A golf ball dispenser can include: a back door including a metal piece to which the first piece of the back panel attaches, wherein the metal piece is coupled with the metal frame through a quick release hinge mounted inside the golf ball dispenser such that the quick release hinge is not visible when the back door is closed, and the metal piece includes wing sections; and a ramp assembly attached to the metal piece with a piano hinge, the ramp assembly including rollers supporting a ramp positioned between the wing sections of the metal piece such that golf balls are contained by the wing sections when dropped onto the ramp.

A golf ball dispenser can include a camera integrated with the golf ball dispenser and arranged to capture a full swing of a golf club, including impact of the golf club with the golf ball when the golf ball is hit from the tee area, for use in generating information for display on the display device integrated with the golf ball dispenser. Further, the golf ball dispenser can include a second camera integrated with the golf ball dispenser and arranged to capture a full swing of a second golf club, including impact of the second golf club with a second golf ball when the second golf ball is hit from an adjacent tee area served by a second golf ball dispenser, for use in generating information for display on a second display device integrated with the second golf ball dispenser.

The display device in a golf ball dispenser can be a touchscreen display device that is at least forty inches in a diagonal dimension of the touchscreen display device, and the touchscreen display device and the camera can be communicatively coupled with one or more computers programmed to control operations of a golf bay in which the golf ball dispenser is located based on inputs to the touchscreen display device, facial recognition processing performed on imagery from the camera, or both.

A golf ball dispenser can include an angled top portion of the golf ball dispenser that includes a protruding lip along an upper end of the angled top portion of the golf ball dispenser, the protruding lip being configured to redirect golf balls travelling along the angled top portion of the golf ball dispenser and toward an adjacent golf bay.

A golf ball dispenser can include at least one light source separate from the display device, the at least one light source configured to provide a full spectrum of colors, and the at least one light source being coupled with at least one controller configured to adjust the colors of the at least one light source in response to one or more events selected from a group including a golf ball dispense, a golf ball dispenser service request, a current state of the golf bay in which the golf ball dispenser is located, and a current aspect of a game being played from the tee area served by the golf ball dispenser. The at least one light source can be a light emitting diode (LED) bar.

The at least one light source can be a light source proximate to the outlet of the golf dispenser, and the at least one controller can be configured to adjust a color of the light source proximate to the outlet by changing the color of the light source proximate to the outlet from a first color to a second color in response to release of a golf ball by the gateway from the receptacle into the passageway, and changing the color of the light source proximate to the outlet from the second color to at least one third color once the released golf ball reaches the outlet of the golf dispenser.

The at least one controller can include a computer programmed to change the color of the light source proximate to the outlet to a color corresponding to a target to be hit in accordance with the game being played from the tee area served by the golf ball dispenser.

The target can be a physical target on a golf range in front of the tee area and the golf ball dispenser. The target can be a virtual target in the game being played from the tee area served by the golf ball dispenser.

A golf ball dispenser can include a distance measurement device configured to detect how full the receptacle is. The gateway in a golf ball dispenser can include a screw inside a hopper underneath an opening in a bottom portion of the receptacle, and the golf ball dispenser can include a steel frame positioned around the opening and between the bottom portion of the receptacle and the hopper containing the screw.

The receptacle in the golf ball dispenser can include an access panel positioned on a bottom portion of a side of the receptacle, the access panel being configured to be opened to facilitate emptying the golf balls from the receptacle. Moreover, a golf ball dispenser can include a second receptacle configured to hold additional golf balls, the second receptacle being accessible (e.g., during a power outage) via an upper back door of the golf ball dispenser, wherein the second receptacle includes two baskets configured to be linked together once removed from the golf ball dispenser.

In addition, one or more aspects of the subject matter described in this specification can be embodied in methods, systems, and apparatus, including medium-encoded computer program products, for performing the operations described in this application in connection with a golf ball dispenser.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
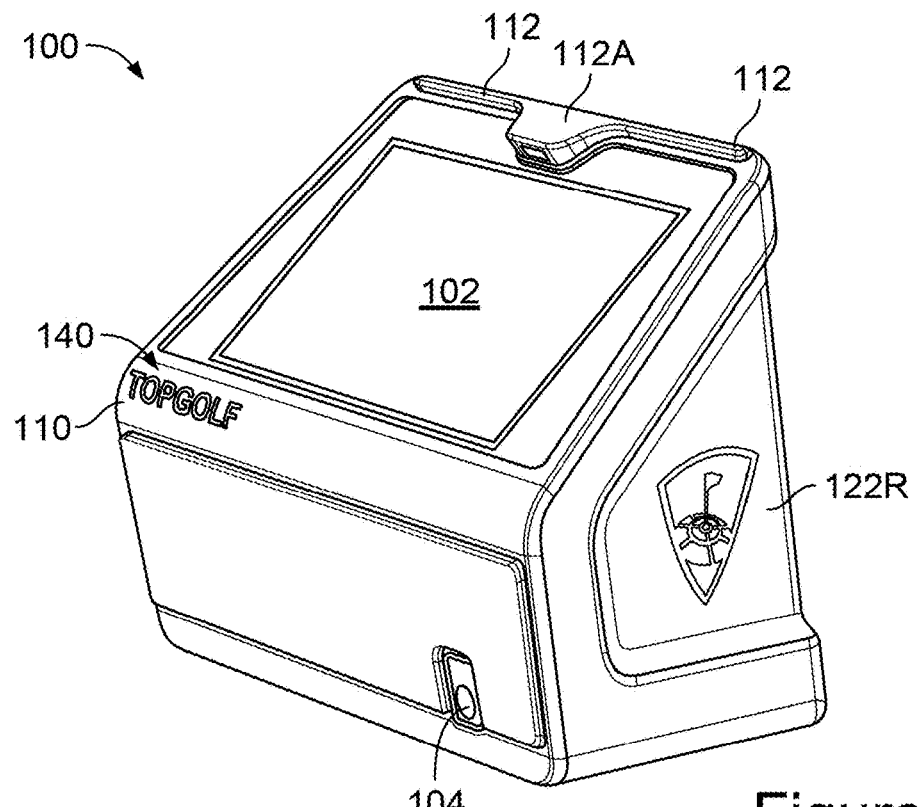
FIGS. 1A and 1B show an example of a golf ball dispenser with a display device integrated into the golf ball dispenser.
Figure 1B:
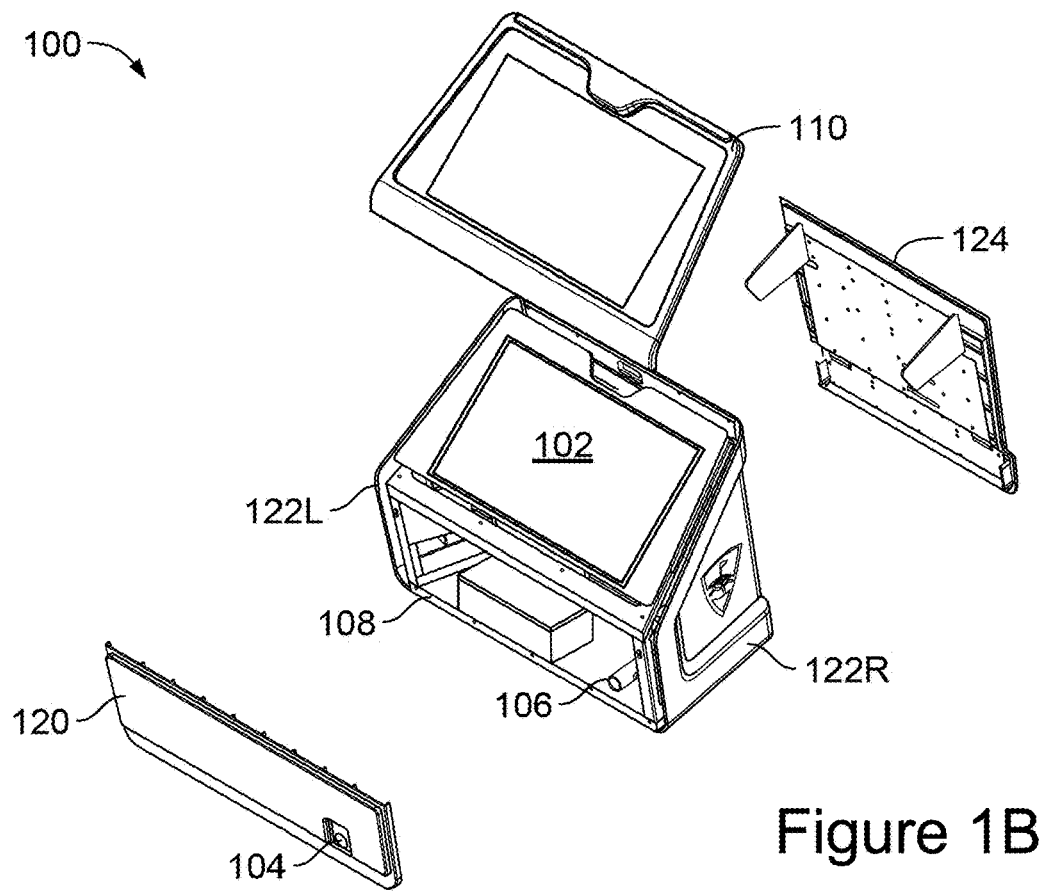

FIG. 1A shows an example of a golf ball dispenser 100 with a display device 102 integrated into the golf ball dispenser 100, and FIG. 1B is a partially exploded view of the golf ball dispenser 100 from FIG. 1A. In this example, the display device 102 is embedded in the golf ball dispenser 100, meaning the display device 102 is fully enclosed in the golf ball dispenser, protected from golf ball strikes (e.g., from errant golf shots), and forms an essential part of the golf ball dispenser. The display device can be at least forty inches in a diagonal dimension and/or be a touchscreen display device. The display device 102 can be an LCD (liquid crystal display), OLED (organic light emitting diode) or other type of display device, and the display device 102 is configured to be connected (with wires, wirelessly, or both) to a computer system that is programmed to present information on the display device 102 for viewing by a user of the golf ball dispenser 100. For example, the presented information can include information regarding a golf ball in flight after the golf ball is hit from a tee area served by the golf ball dispenser 100, e.g., an animation showing the golf ball flight in a virtual world (the ball flight characteristics being determined from sensor data of the ball's actual flight in the real world) and/or other dynamically determined or other content, such as a television show or other video data, static images, brand elements, and/or interactive user interface screens for the game being played by the golfers using the golf ball dispenser 100, etc.

The golf ball dispenser 100 includes an outlet 104, which is connected with a passageway 106, through which a golf ball is delivered to the tee area served by the golf ball dispenser 100. The golf ball dispenser 100 can further include a metal frame 108 with which other components of the golf ball dispenser 100 attach, e.g., with screws, bolts, and/or tabs. In some implementations, the frame is constructed from sheet metal to reduce the costs of manufacture. The other components include a top panel 110, a front panel 120, a right side panel 122R, a left side panel 122L, and a back door 124. The metal frame 108 can be made of steel, e.g., powder coated steel, and the panels 110, 120, 122R, 122L can be made of one or more types of plastic or similar materials, e.g., High Density Polyethylene (HDPE) material, which can have varying degrees of thickness and can be designed to stand up to extreme temperatures as well as impact from objects, such as balls, clubs, other devices, etc.

As shown, the upper portion of the golf ball dispenser 100 is angled. Note that having the display device 102 be more vertical facilitates viewing of the information presented on the display device 102 by the player and decreases the risk of a player in an adjacent bay being hit, but also increases the risk that an errant golf ball that hits the display portion of the golf ball dispenser 100 will bounce straight back and hit the player. Thus, an angled orientation for the display device 102 facilitates viewing while also reducing the risk of injury. In some implementations, the angle is between forty and fifty degrees with respect to the ground horizontal. In some implementation, the angle is between forty two and a half degrees and forty seven and a half degrees with respect to the ground horizontal. In some implementation, the angle is between forty four and forty six degrees with respect to the ground horizontal. In some implementation, the angle is forty four and a half, forty five, or forty five and a half degrees with respect to the ground horizontal.

In addition, because the golf ball dispenser 100 is often used to serve a tee area that has adjacent tee areas, a golf ball that travels at the same angle up and along the top portion of the golf ball dispenser 100 can potentially hit a player in the adjacent tee area. Thus, in some implementations, the top panel 110 forming the angled top portion of the golf ball dispenser 100 includes a protruding lip 112 (e.g., a molded plastic protrusion) along an upper end of the angled top portion of the golf ball dispenser. The shape of this structure 112 will redirect golf balls travelling along the angled top portion of the golf ball dispenser 100 and toward an adjacent golf bay, when the golf balls hit the protruding lip 112, to thereby provide additional protection to the player in the adjacent tee area. Moreover, in some implementations, the protruding lip 112 includes an extended portion 112A to house a camera system, as described in further detail below.

Figure 1C:
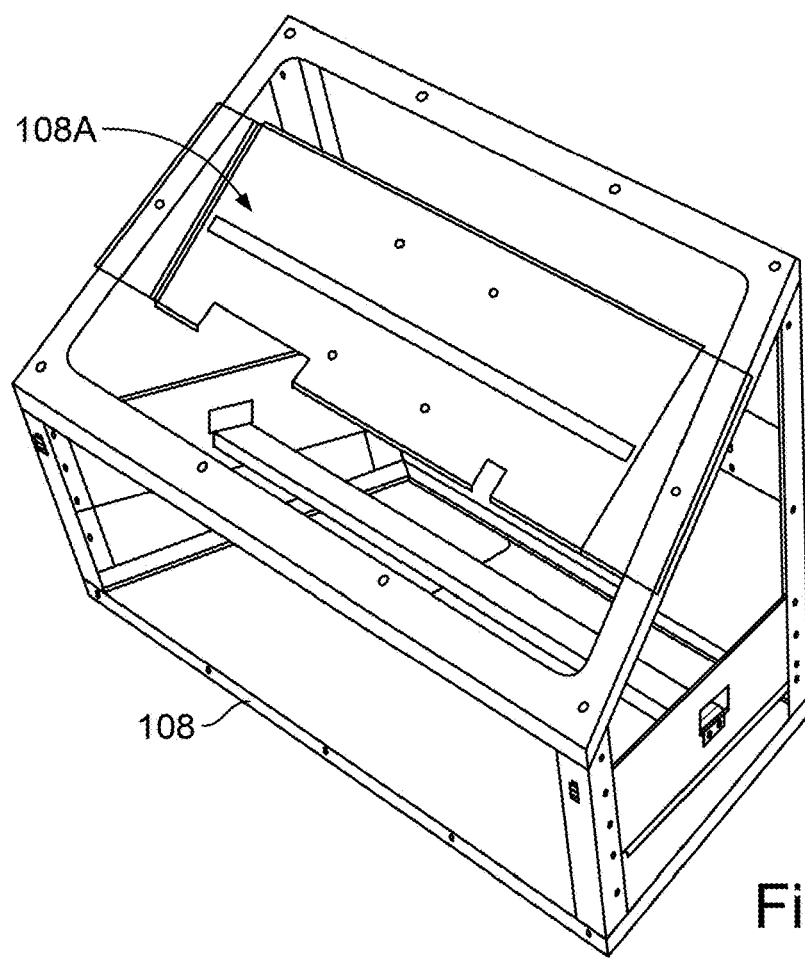
FIG. 1C shows the metal frame from the golf ball dispenser of FIG. 1A, with all other components removed.

FIG. 1C shows the metal frame 108 from the golf ball dispenser of FIG. 1A, with all other components removed. As shown, the metal frame 108 defines a recess 108A that receives the display device 102 in an angled top portion of the golf ball dispenser 100. In some implementations, the metal frame 108 defines another recess to receive an impact resistant shield 115. In other implementations, the top panel 110 defines a recess to receive the impact resistant shield 115, as shown in FIG. 1D, which shows a cross section of the golf ball dispenser 100.

Figure 1D:
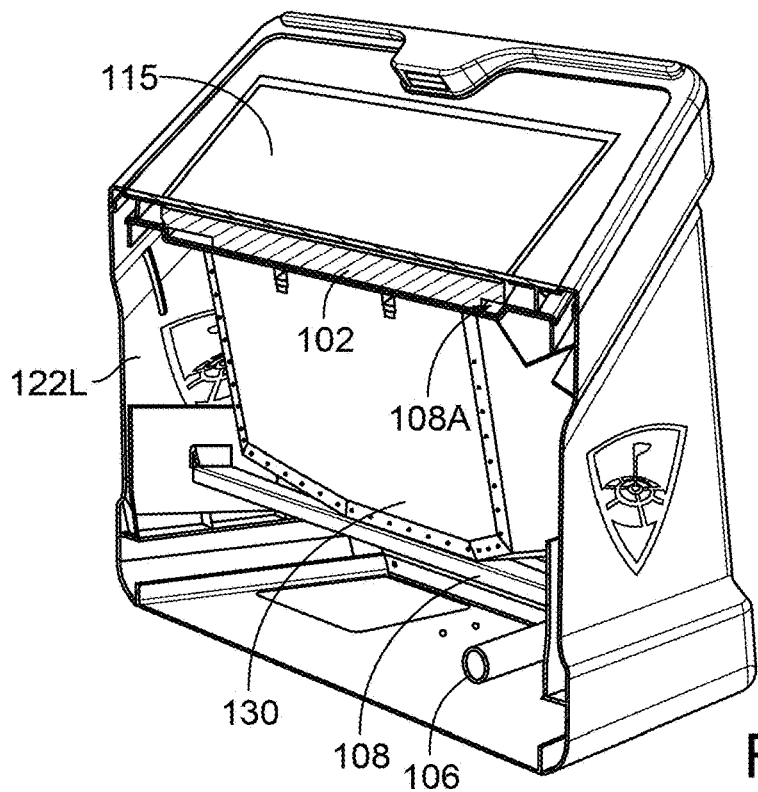
FIG. 1D shows a cross section of the golf ball dispenser of FIG. 1A.
Figure 1F:
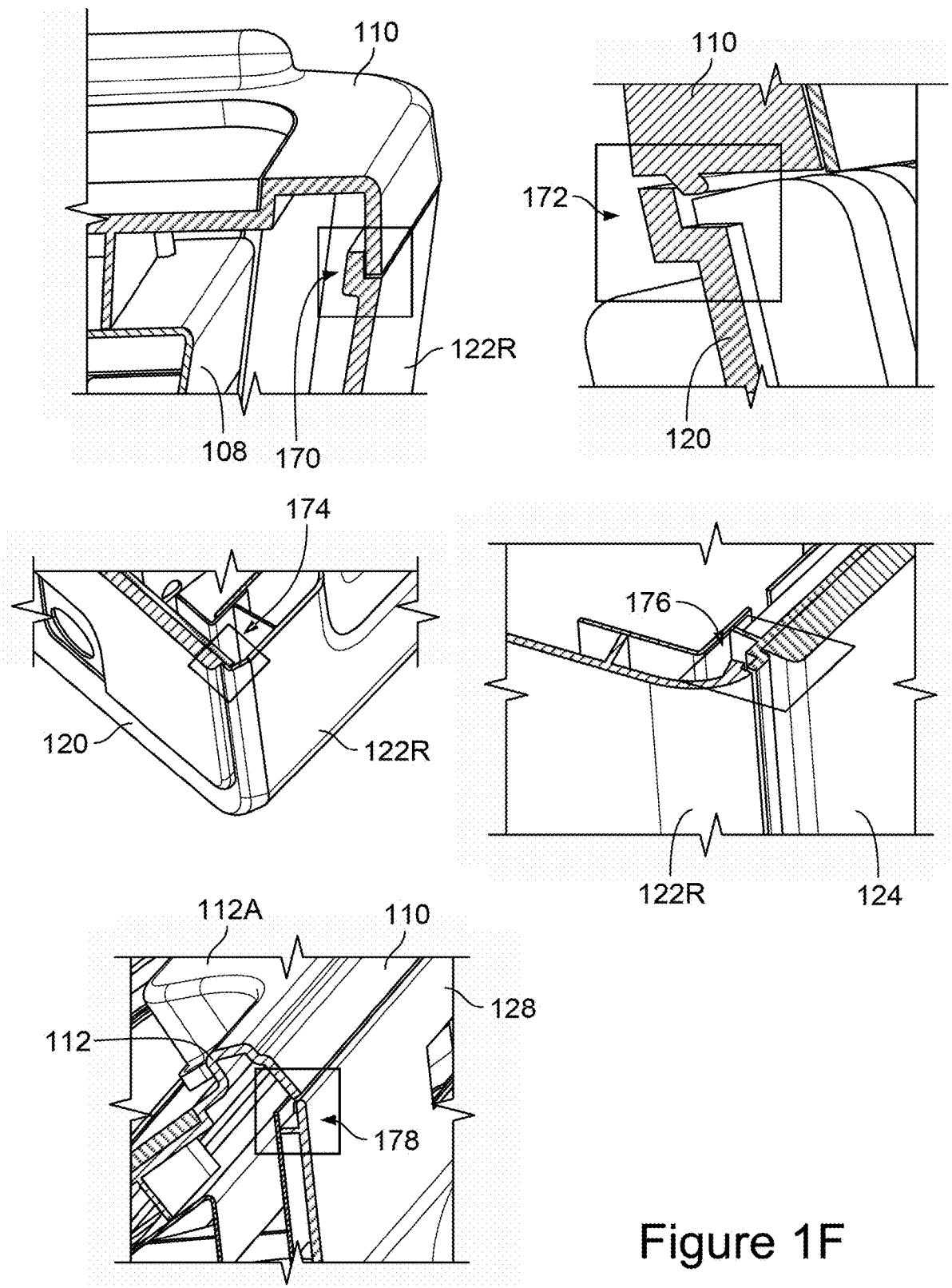
FIG. 1F shows additional cross sections of the golf ball dispenser of FIG. 1A.
Figure 1E:
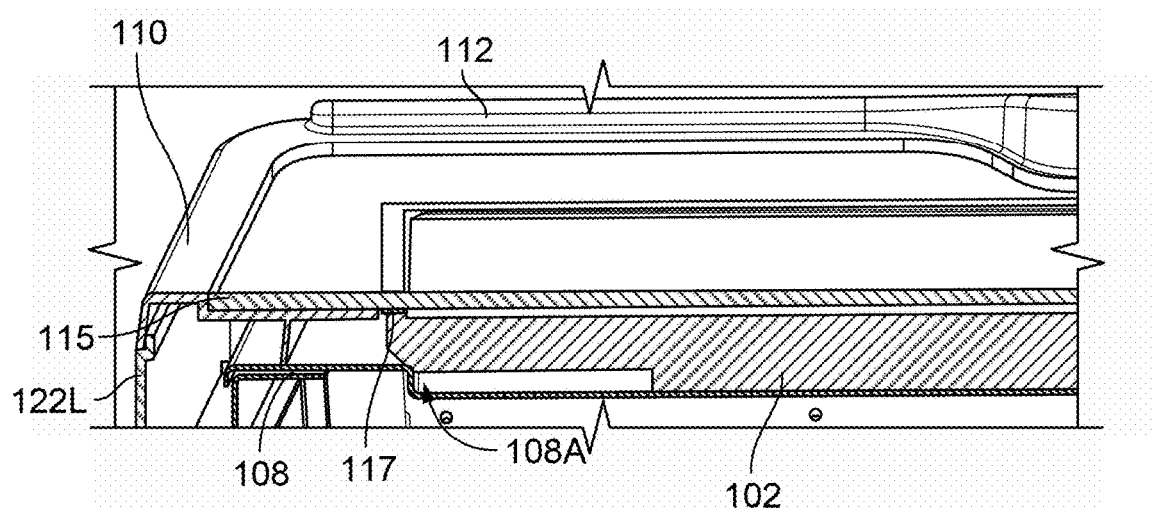
FIG. 1E shows a closer view of another cross section of the golf ball dispenser of FIG. 1A.

In FIG. 1D, a portion of the metal frame 108 is shown underneath and supporting a receptacle 130, which can hold multiple golf balls, e.g., one thousand four hundred and fifty golf balls to two thousand golf balls, and the passageway 106 connects the outlet (not shown) of the golf ball dispenser with the receptacle 130. Further, a recessed portion 108A of the metal frame 108 holds the display device 102 in place in an angled top portion of the golf ball dispenser 100. FIG. 1E shows a closer view of another cross section of the golf ball dispenser 100. As shown, the left side panel 122L attaches to the metal frame 108, the display device 102 rests in the recess portion 108A of the metal frame 108, and the top panel 110 attaches to the left side panel 122L and/or the metal frame 108. The top panel 110 includes a recess that is shaped to receive the impact resistant shield 115 and also defines an opening through which the display device 102 can be viewed.

A gasket 117 (e.g., a foam gasket) is positioned over the display device 102 (around the perimeter of the display device 102 and adjacent the opening in the top panel 110) in the angled top portion of the golf ball dispenser, and the impact resistant shield 115 is positioned over the recessed portion of the top panel 110, over the gasket 117, and over the display device 102 in the angled top portion of the golf ball dispenser. Thus, the impact resistant shield 115 protects the display device 102. Further, the method of installation of the shield 115 using the gasket 117, as shown, can provide environmental protection against dust, dirt and sand, as well as general water resistance, e.g., an ingress protection (IP) rating of up to IP54.

In some implementations, the impact resistant shield 115 is an acrylic shield, which is good for shatter proofing. In some implementations, the acrylic shield 115 has a polycarbonate film that protects the acrylic material from scratches and scuffs. In some implementations, a texture is applied to the acrylic to reduce glare and mask aesthetic imperfections. Other materials or combinations of materials are also possible, such as a layering of materials designed to improve impact performance and durability. In any case, the impact resistant shield 115 serves to embed and protect the underlying display device 102 in the angled top portion of the golf ball dispenser.

Further, in some implementations, the various exterior panels that connect with the metal frame 108 are modular, employing an independently interlocking panel design, e.g., using tongues and grooves to securely lock the panels together about the metal frame 108. FIG. 1F shows additional cross sections of the golf ball dispenser of FIG. 1A. A first tongue and groove connection 170 is used to interlock the top panel 110 with the right side panel 122R. Note that a mirror image of the tongue and groove connection 170 is used for the left side panel 122L. A second tongue and groove connection 172 is used to interlock the top panel 110 with the front panel 120. An aligned portion 174 is used to match the front panel 120 with the right side panel 122R. Note that a mirror image of the first aligned portion 174 is used for the left side panel 122L. A first tongue and groove aligned portion 176 is used to match the back panel 124 with the right side panel 122R. Note that a mirror image of the tongue and groove aligned portion 176 is used for the left side panel 122L. A second tongue and groove aligned portion 178 is used to match an upper back door 128 with the top panel 110.

Thus, constructing the golf ball dispenser can proceed as follows: attach all internal components, including the display device 102, to the frame 108; attach the side panels 122R, 122L to the frame 108; attach the front panel 120 to the frame 108; attach the top panel 110 to the frame; insert the gasket 117 in the opening in the top panel 110, around the perimeter of the display device 102; insert the impact resistant shield 115 into the recess defined by the top panel 110; and attach the back door assembly to the frame. Plastic panels of the dispenser can include threaded inserts molded into the plastic, and screws can be inserted through holes in the frame 108 and/or any metal plates of any access door (e.g., the back door assembly and optionally a front door assembly with the front panel 120 attached to it) and then be screwed into the threaded inserts to attach the panels to the frame/metal plates. Weather proofing can be achieved with the interlocking panel design and using gasket material around doors or removable panels.

Figure 2A:
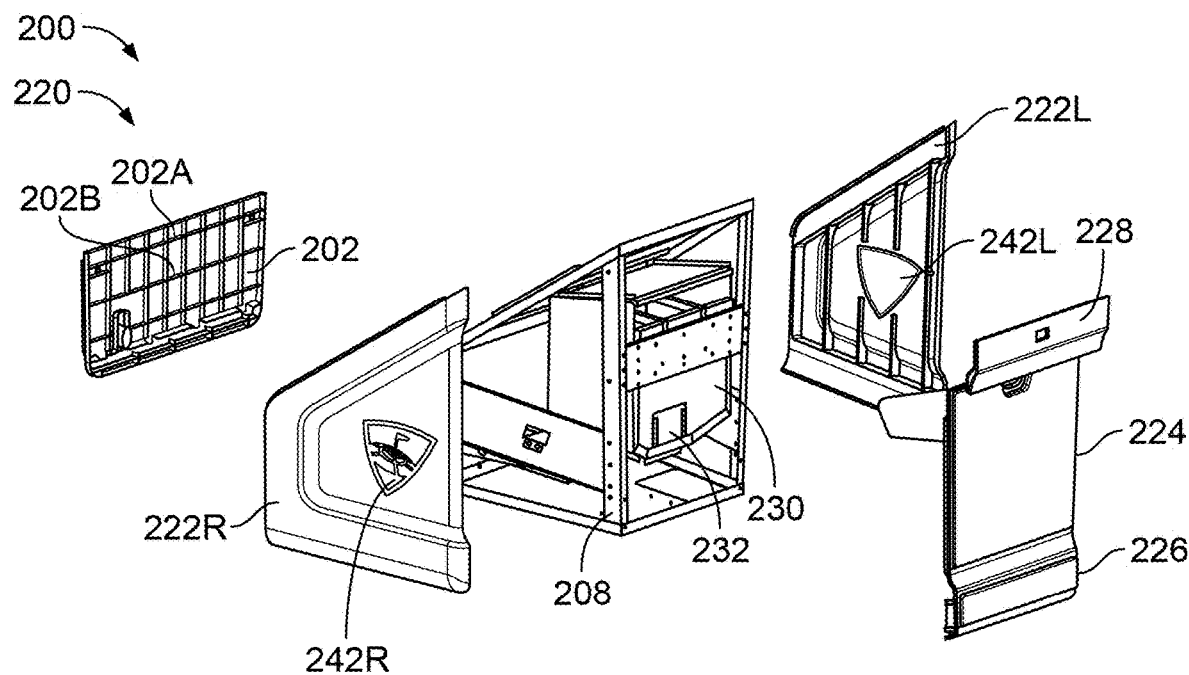
FIG. 2A is a rear perspective view showing an exploded version of a golf ball dispenser.

FIG. 2A is a rear perspective view showing an exploded version of a golf ball dispenser 200. The golf ball dispenser 200 can be the golf ball dispenser 100 with an embedded display device, or the golf ball dispenser 200 can be a golf ball dispenser that does not include a display device. The golf ball dispenser 200 includes a front panel 220, a right side panel 222R, a left side panel 222L, a back door 224, a receptacle 230, and a frame 208 (e.g., the front panel 120, the right side panel 122R, the left side panel 122L, the back door 124, the receptacle 130, and the metal frame 108 of golf ball dispenser 100). Further, the golf ball dispenser 200 includes a back panel 226 and an upper door 228, and the receptacle 230 can include a rear access panel 232.

Figure 4A:
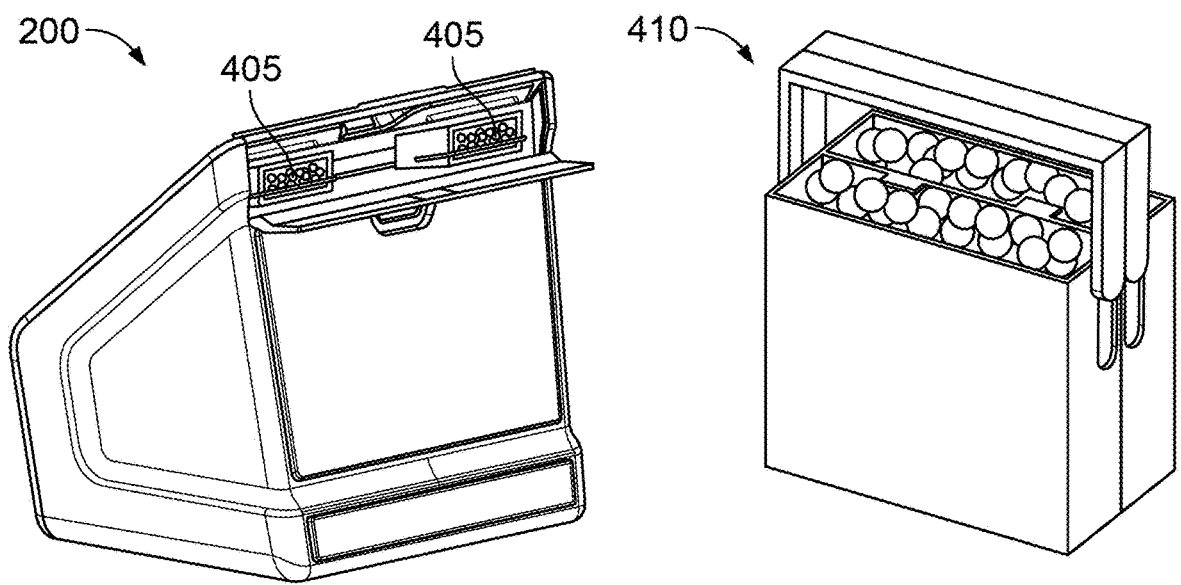
FIG. 4A shows an example of a basket of golf balls stored in a golf ball dispenser for emergency use.

In some implementations, the upper door 228 provides access to another receptacle (positioned above the receptacle 230) that holds additional golf balls and is accessible during a power outage via the upper door 228 on the back side of the golf ball dispenser 200. The additional receptacle can be a set of one or more baskets that are prefilled with golf balls and can be locked and stored inside the dispenser 200. FIG. 4A shows an example of a basket of golf balls 410 stored in a golf ball dispenser 200 for emergency use. In the event of an emergency (e.g., game is down, etc.) an employee can unlock the back door and remove two baskets 405, e.g., two pieces due to size constraints within the dispenser 200, link the two baskets 405 together so as to create the "single" basket 410, and set the basket 410 down for the guest to use as "emergency balls" while the game system is repaired to get back to online status.

Figure 2B:
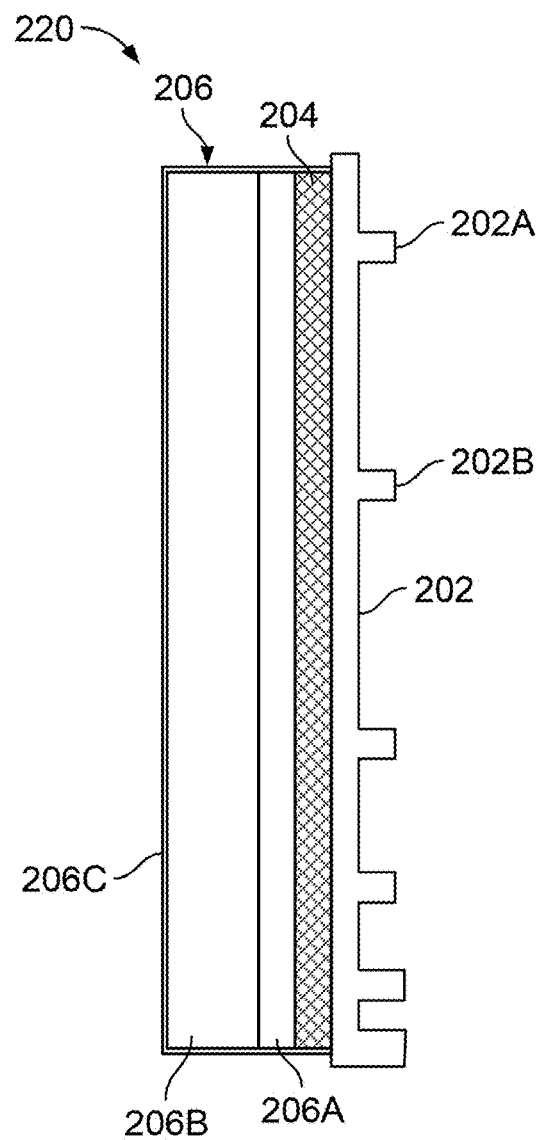
FIG. 2B is a cross section of an example of a front panel from the golf ball dispenser of FIG. 2A.

FIG. 2B is a cross section of an example of the front panel 220 from the golf ball dispenser 200 of FIG. 2A. The front panel 220 can be constructed from separate pieces that attach with each other. A first piece 202 has reinforcing ribs 202A, 202B that increase the strength of the first piece 202, above and beyond the strength of the material (e.g., plastic) itself. The first piece 202 is configured to attach with the metal frame 208, e.g., using screws, bolts, and/or tabs, and the first piece 202 can be made from HDPE material. A second piece covers and attaches with the first piece 202 and forms a pad that reduces the speed of golf balls that hit the pad. The second piece can itself be constructed from two or more pieces of different materials. In some implementations, the second piece includes a base piece 204 that has a strength that is less than the strength of the first piece 202. For example, the base piece 204 can be made from Polyethylene (PE) material. Further, the second piece can include a padding piece 206 that attaches with the second piece 204. For example, the padding piece 206 can be made from one or more foam materials.

Figure 2C:
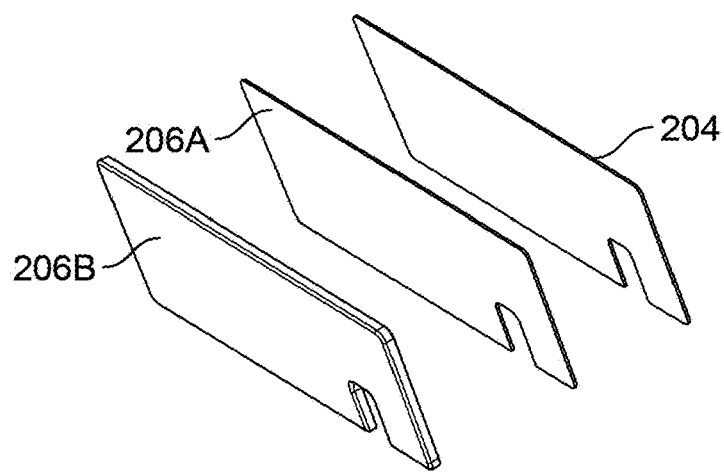
FIG. 2C is a perspective, exploded view of respective pieces of the front panel from FIG. 2B.

In some implementations, the padding piece 206 includes a PE foam 206A and a memory foam 206B, and both of these pieces 206A, 206B attach with a PE board 204. For example, a fabric material 206C can be used as an outside covering that attaches together the pieces 204, 206A, 206B into a single pad that can then be attached to any of the panels facing a tee area, e.g., the front panel 220. FIG. 2C is perspective, exploded view of respective pieces of the padding piece 206 on the front panel from FIG. 2B. In this example, the single pad is constructed from a 4 mm thick PE board 204, a 6 mm thick Expanded Polyethylene (EPE) foam 206A, and a 25 mm thick memory foam 206B. Note that foam layers 206A, 206B can be adhesively attached to the PE board 204, which is strong enough to hold inserted screws for use in attaching the pad to the first piece 202, and facilitates quick changes of the pad, e.g., due to damage.

This layered design for the padding on a panel provides strength to withstand errant ball and club hits, but also facilitates replacement of damaged pieces. The outermost piece 206 helps reduce the speed of golf balls that bounce off the dispenser 200, and thus reduce injury, and the separate pieces forming the panel can be individually replaced when they are damaged. Note that the other exterior surfaces of the golf ball dispenser 200 can also employ this three layered design, in particular, those exterior surfaces that generally face a tee area. Thus, the back door 224 and the back panel 226 can also use the same multi-piece construction.

Figure 2D:
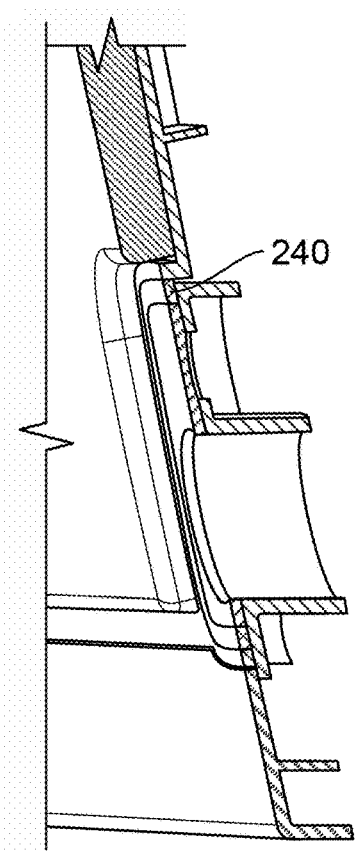
FIG. 2D is another cross section of an example of a front panel from the golf ball dispenser of FIG. 2A showing an example of a light source for the outlet of the golf ball dispenser.

FIG. 2D is another cross section of an example of a front panel from the golf ball dispenser 200 showing an example of a light source 240 for the outlet of the golf ball dispenser 200. In this example, the light source 240 is a light emitting diode (LED) bar, but other types of light sources are also possible, such as a flexible strip or custom printed circuit board. In any case, the light source 240 provides a full spectrum of colors in response to signals from a controller. The controller can be included in the golf ball dispenser 200 or be separate from it; the controller can be connected to the light source 240 with wires, wirelessly, or both. The controller can be configured (by circuitry and/or program code) to adjust the colors and/or intensity of the light source 240 in response to one or more events, including: a golf ball dispense, a golf ball dispenser service request, a current state of the golf bay in which the golf ball dispenser is located, and a current aspect of a game being played from the tee area served by the golf ball dispenser.

In addition, the golf ball dispenser 200 can include more than one light source, which can be used to indicate the same or different events associated with the golf ball dispenser 200 and/or the tee area or golf bay served by the golf ball dispenser 200. For example, the golf ball dispenser can include four light sources, a first light source 240 near the outlet (e.g., outlet 104 in FIG. 1A), a second light source to light up a word 140 or other symbol(s) on the front of the golf ball dispenser, a third light source to light up a right side logo 242R or other symbol(s) on the right side of the golf ball dispenser, and a fourth light source to light up a left side logo 242L or other symbol(s) on the left side of the golf ball dispenser. Note that the logos 242R, 242L and the word 140 TOPGOLF® are images of registered trademarks of Topgolf International, Inc. A control system for the golf ball dispenser 200 can control the four light elements on the dispenser 200 independently. For example, each light source can be uniquely controlled through one controller, where the controller sends an RGB (Red/Green/Blue) profile indicating what color to change the respective lights to.

Other light elements can be controllable as well including intensity and special effects, e.g., pulsating, gradients, etc. Further, other lighting sources/elements are also possible, such as a light source on the top of the dispenser 200, and lighting control can be synchronized across multiple golf ball dispensers located at a golf facility. In some implementations, each light across multiple dispensers can be systematically controlled using software and/or manually controlled through an application program interface (API) to a provided lighting control interface program.

Figure 2E:
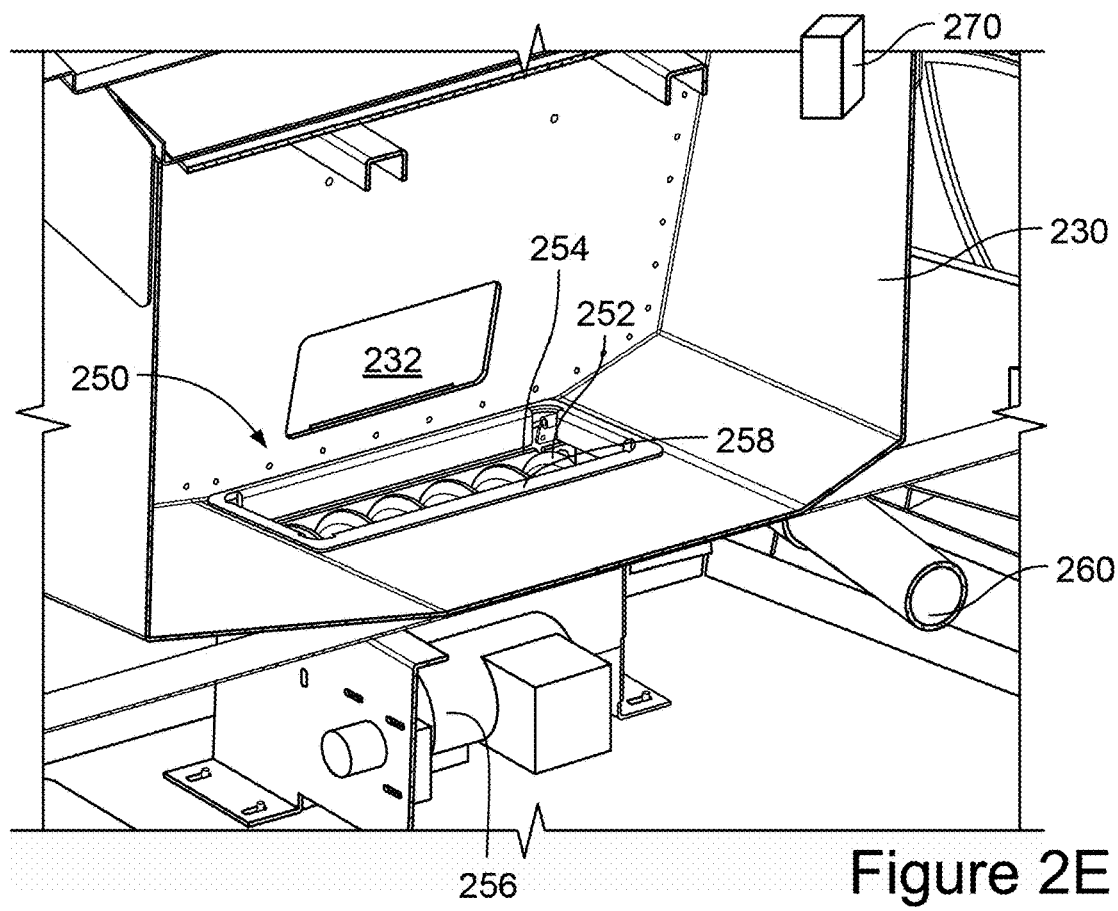
FIG. 2E is a cross section of the golf ball dispenser showing an example of a gateway for golf ball release.

FIG. 2E is a cross section of the golf ball dispenser 200 showing an example of a gateway 250 for golf ball release. The gateway 250 is coupled between the receptacle 230 and a passageway 260 to restrict a passage of the multiple golf balls (not shown) held in the receptacle 230 into the passageway 260. The gateway 250 is selectively moveable to allow a golf ball to pass from the receptacle 230 into the passageway 260 for delivery to a tee area. Various drive systems can be employed for the gateway 250. For example, the gateway 250 can include a screw 252 inside a hopper 254 underneath an opening in a bottom portion of the receptacle 230, as shown. A motor 256 is configured (by circuitry and/or program code) to controllably release a single ball based on a given input signal, e.g., in response to a sensor positioned near the outlet of the golf ball dispenser 200 detecting a club passing in front of the outlet.

Other drive systems are also possible. Further, in some implementations, the golf ball dispenser 200 includes a steel frame 258 positioned around the opening and between the bottom portion of the receptacle 230 and the hopper 254 containing the screw 252. The steel frame 258 facilitates withstanding additional pressure from the golf balls, reducing the chances of the ball screw 252 jamming due to pressure when the receptacle 230 is completely full. In some implementations, the receptacle 230 is made from steel, e.g., powder coated steel.

In some implementations, the golf ball dispenser 200 includes a sensor 270 within the receptacle 230. The sensor 270 can be a distance measurement device, such as an infrared proximity sensor, where the number of golf balls in the receptacle 230 can be estimated based on the distance to the golf balls in the receptacle 230. The sensor 270 detects how full the receptacle 230 is, and sends a signal when the golf ball dispenser 200 needs to be refilled. This signal can be sent to a central computer system for the golf facility and/or or to the lighting controller for the golf ball dispenser. For example, such signals from multiple sensors 270 in multiple golf ball dispensers 200 can be sent to a central computer to give a live view of the ball counts across all dispensers in a golf facility, providing the ability to proactively monitor and refill dispensers. As another example, the light source(s) for one or more of the symbols 140, 242R, 242L can be changed in color and/or intensity in response to a signal that the golf ball dispenser 200 needs to be refilled.

As noted above, various different events can trigger different lighting effects. Additional details regarding lighting effects are provided below, but an example is now given with reference to FIGS. 2D and 2E. In this example, the controller is configured to adjust a color and/or intensity of the light source 240 around the outlet by changing the color and/or intensity of the light source 240 from a first color and/or intensity to a second color and/or intensity in response to release of a golf ball by the gateway 250 from the receptacle 230 into the passageway 260, and changing the color and/or intensity of the light source 240 from the second color and/or intensity to at least one third color and/or intensity once the released golf ball reaches the outlet of the golf dispenser 200. For example, the light source 240 changes to a different color when the ball release signal is received, and then the light source 240 changes across a color gradient during the time it takes for a golf ball to be pushed into the passageway 260 by the screw 252, and then for the golf ball to roll through the passageway 260 to the outlet. Thus, the player is provided immediate feedback regarding the ball release and is provided continuous feedback regarding the progress of the ball to the outlet.

Figure 2F:
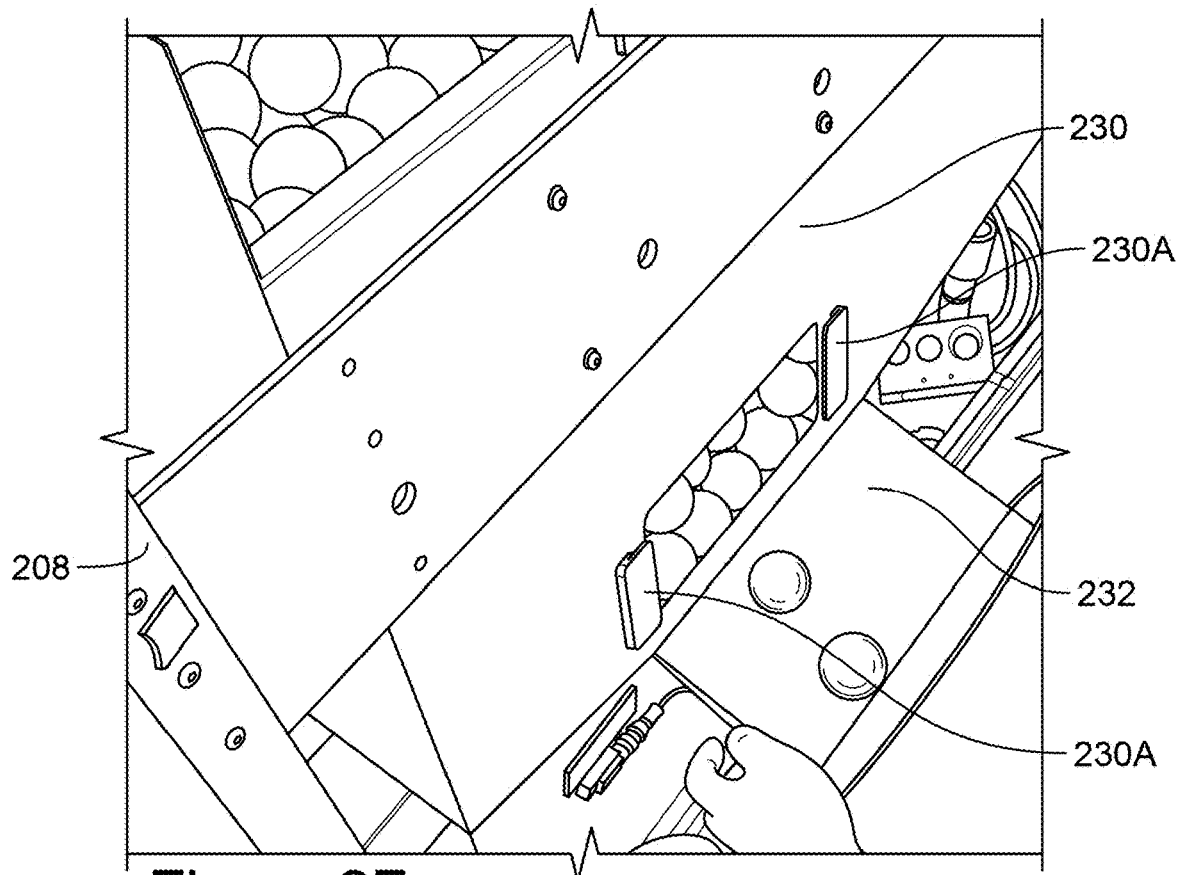
FIG. 2F shows an example of an access panel useable to empty the golf ball receptacle.

FIG. 2F shows an example of an access panel 232 useable to empty the golf ball receptacle 230. In this example shown, the access panel 232 slides in and out of two flanges 230A that hold the access panel 232 in place on a bottom portion of a back side of the receptacle 230. In some implementations, the access panel 232 is hinged at a proper height to allow golf balls to naturally flow down over the hinged door (which becomes a ramp) out of the dispenser 200 and into a portable storage container.

Figure 3A:
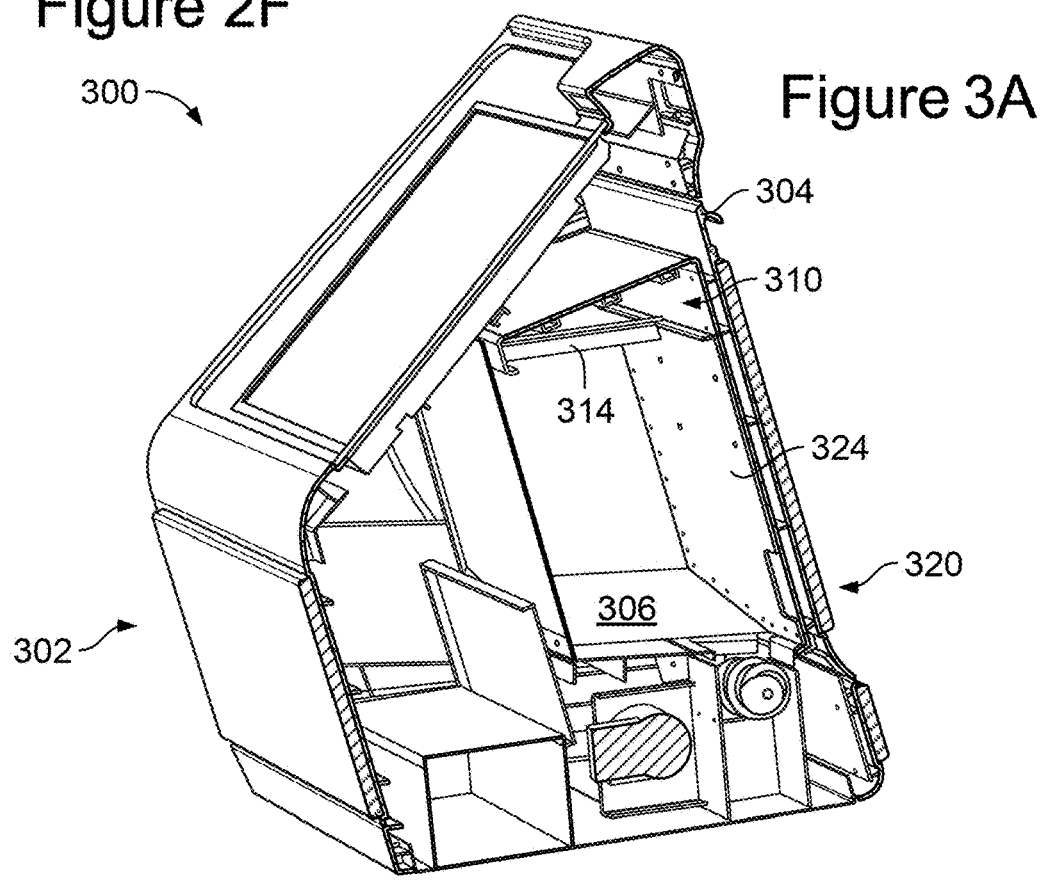
FIG. 3A is a cross section of a golf ball dispenser.

FIG. 3A is a cross section of a golf ball dispenser 300. The golf ball dispenser 300 can be the golf ball dispenser 100 and/or the golf ball dispenser 200. The golf ball dispenser 300 includes a front panel 302, a back door 304, and a receptacle 306 (e.g., the front panel 120, 220, the back door 124, 224, and the receptacle 130, 230 of golf ball dispenser 100, 200). In addition, the golf ball dispenser 300 includes a ramp assembly 310.

Figure 3B:
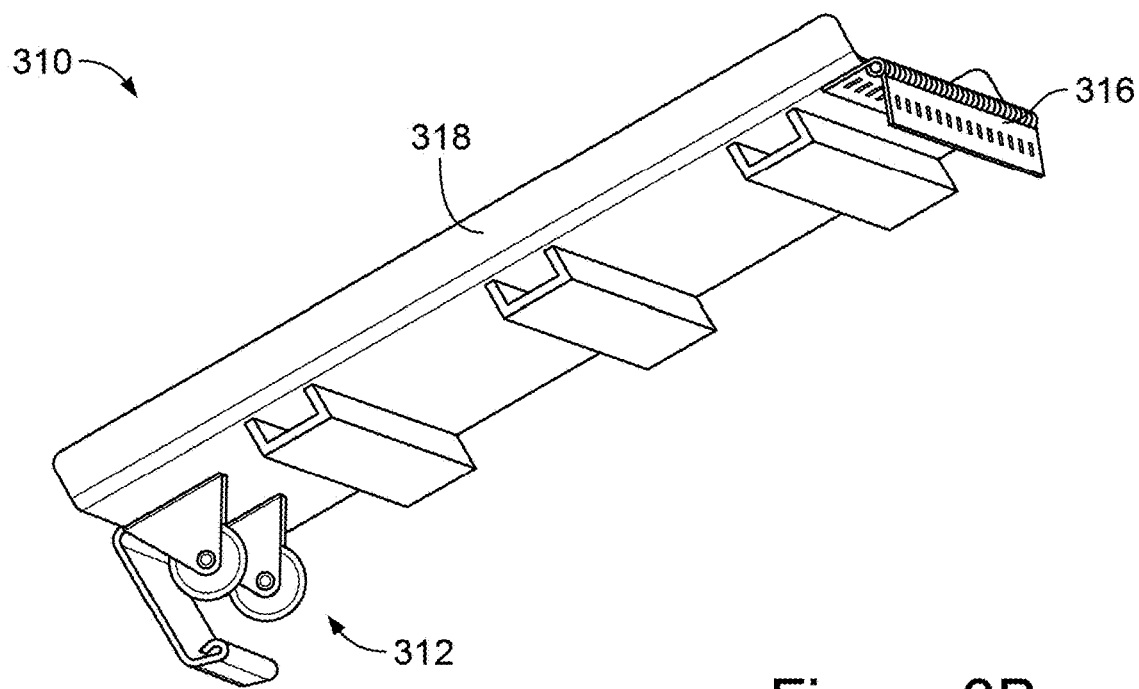
FIG. 3B is a perspective view showing a ramp assembly.

FIG. 3B is a perspective view showing the ramp assembly 310. The ramp assembly 310 is a sliding shelf that uses rollers (e.g., casters) 312 that roll along rails 314 within the dispenser, e.g., along the top of support and cross bars 314 attached to the top of the receptacle 306. The ramp assembly 310 includes a piano hinge 316, e.g., a zinc plated steel piano hinge, which is used to attach the ramp 318 to a metal plate 324 of the back door 304. As shown, when the back door 304 is closed, the ramp 318 covers the receptacle 306, and when the back door 304 is opened, the ramp 318 extends out the back of the dispenser 300 to allow for easy refilling with golf balls, and then when the back door 304 is closed, the ramp 318 returns to its resting position inside the golf ball dispenser 300.

Figure 3C:
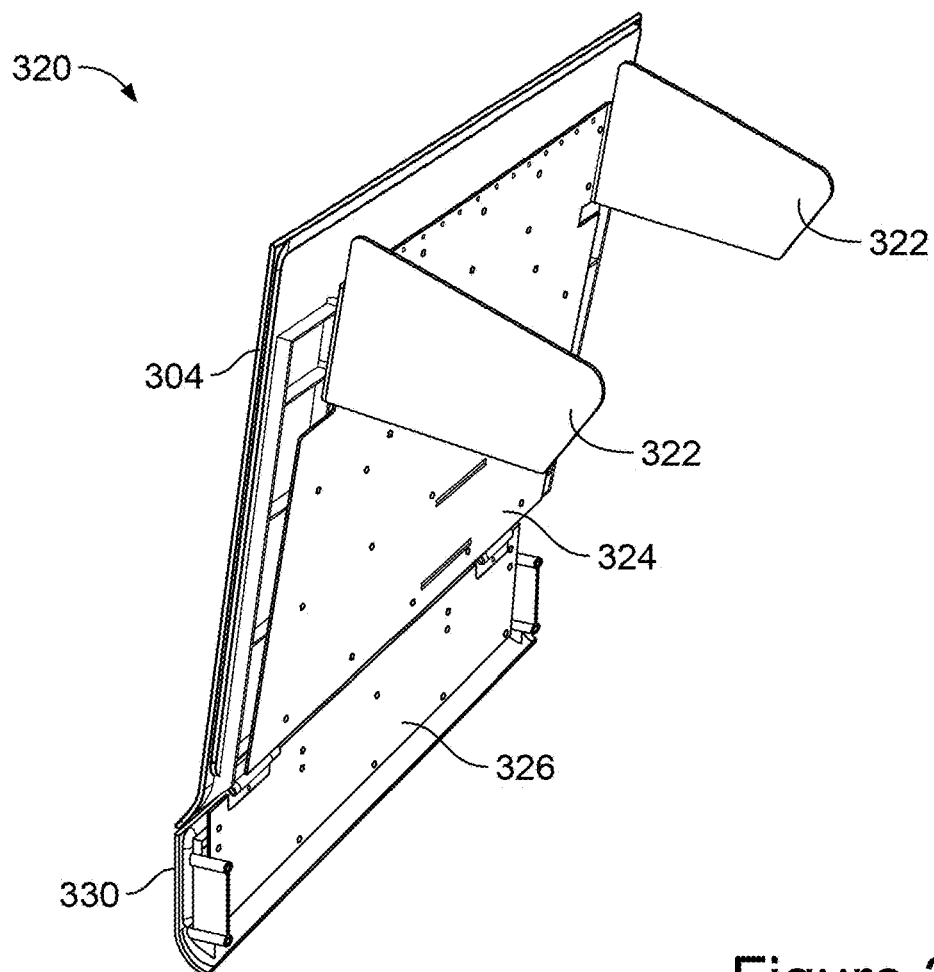
FIGS. 3C and 3D are perspective views showing respective portions of a back door assembly.
Figure 3D:
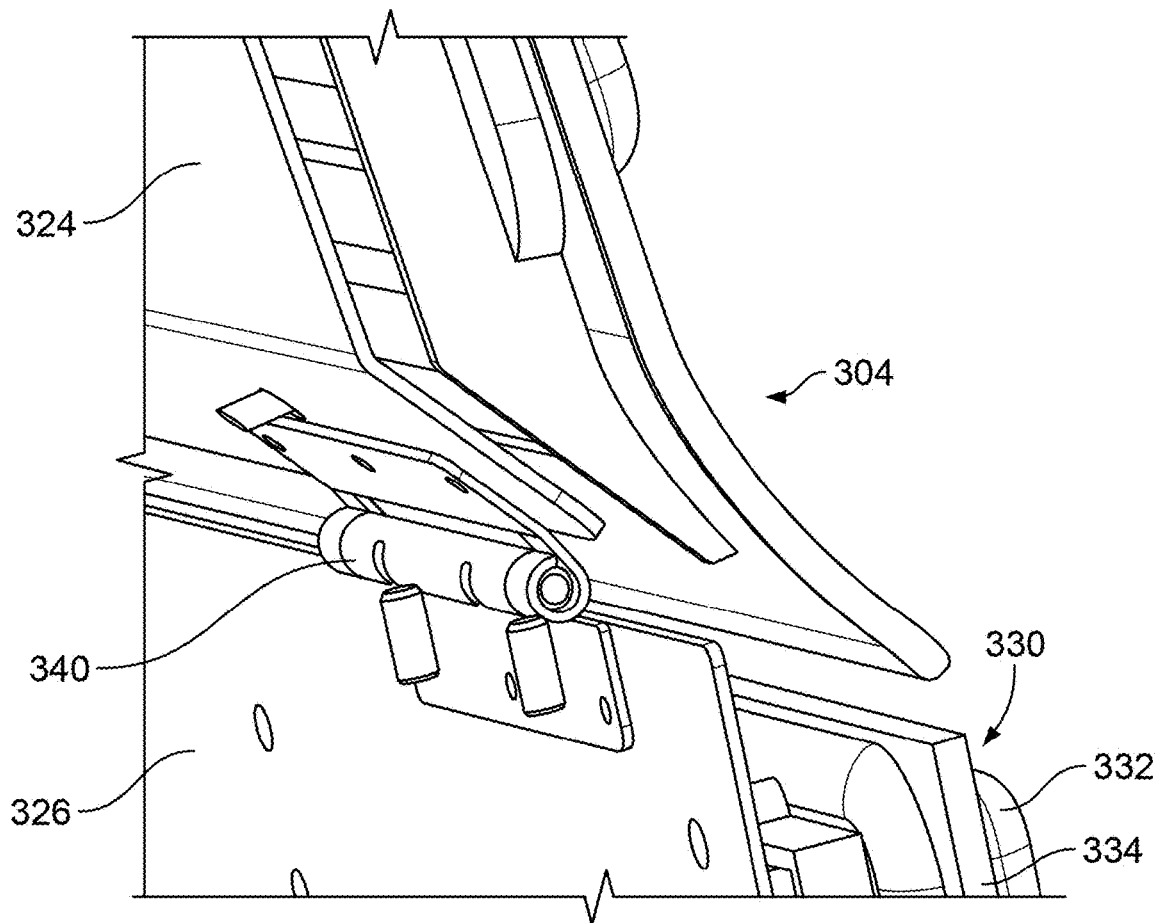

FIGS. 3C and 3D are perspective views showing respective portions of a back door assembly 320. The back door assembly 320 includes the back door 304 and a back panel 330 below the back door 304. As with the back door 224 and the back panel 226 from golf ball dispenser 200, the back door 304 and the back panel 330 can also use the same multi-piece construction with foam padding. Thus, the back panel 330 can be constructed from an HDPE piece 334 and a three layer pad 332, including a memory foam, with fabric over the pad 332.

The back door 304 attaches to the metal plate 324, e.g., using screws, bolts and/or tabs. The back panel 330 attaches to a metal plate 326, e.g., using screws, bolts and/or tabs. In some implementations, the metal plate 326 is a portion of the metal frame for the golf ball dispenser 300. Further, the metal plate 324 attaches with the metal plate 326 using one or more hinges, which allows the back door 304 to be opened and closed. In some implementations, two quick release hinges 340 are mounted inside the golf ball dispenser 300 (as shown in FIG. 3D) such that the quick release hinge 340 is not visible when the back door 304 is closed. Using a quick release hinge facilitates removing the back door entirely when this is needed for servicing of the golf ball dispenser 300.

Moreover, in some implementations, the front panel 302 (e.g., front panel 120, 220) is implemented as a front door in the manner described for the back door 304, with quick release hinges that are not visible when the front door is closed. This facilitates removing the front door entirely as well, and allows easy servicing from either side of the golf ball dispenser. Enabling servicing of the golf ball dispenser from either side minimizes disturbance of guests in the tee area that is not served balls by the dispenser being serviced by a technician.

Figure 4B:
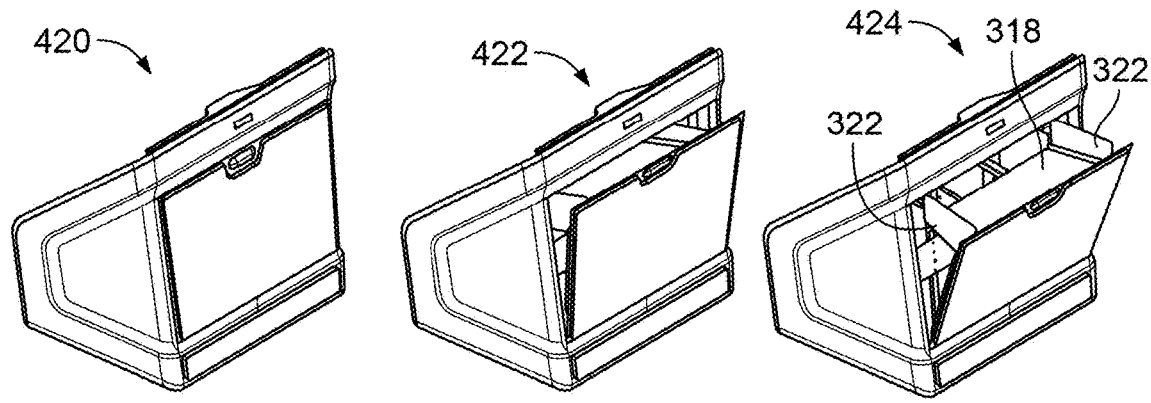
FIGS. 4B-4E show examples of the back door and ramp assemblies in use.
Figure 4C:
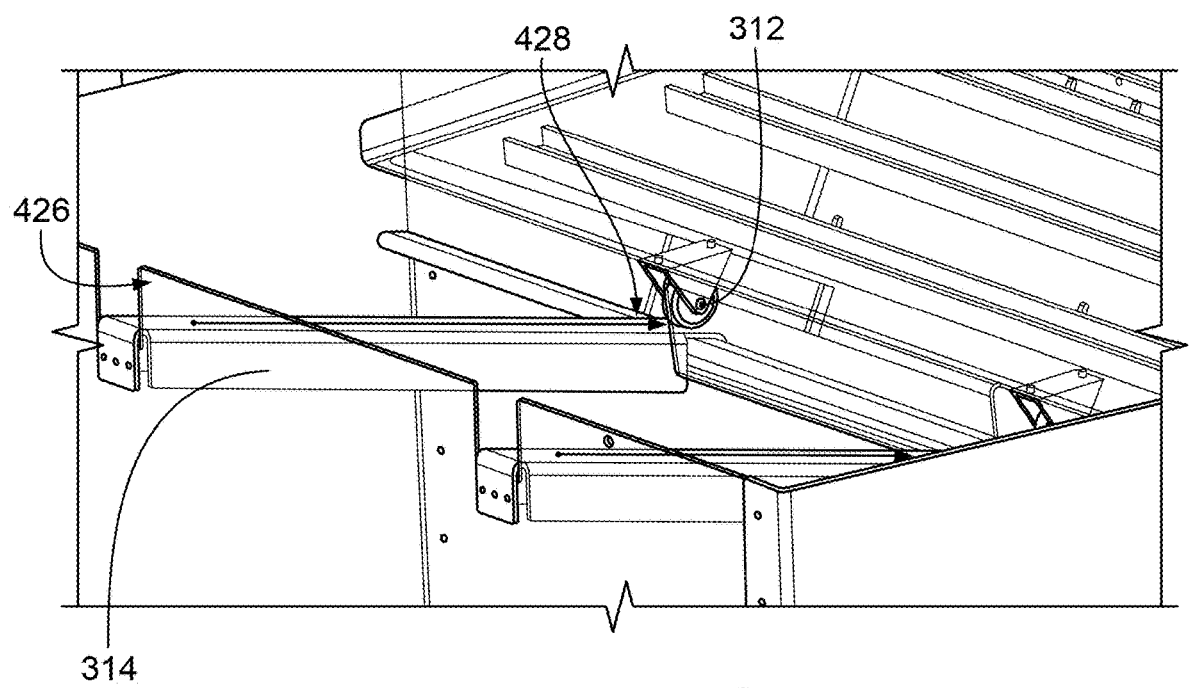

In addition, the back door assembly 320 can include wings 322, which can be made of metal, e.g., the wings 322 can be bent side portions of the metal plate 324. In some implementations, the wings 322 and metal pieces 324, 326 are made from steel, e.g., powder coated steel. The wings 322 serve to keep golf balls on the ramp 318 during loading of the receptacle 306. FIGS. 4B-4E show examples of the back door and ramp assemblies in use. In FIG. 4B, the back door is initially closed 420, then partially opened 422, and then opened fully 424, revealing the wings 322 on either side of the ramp 318. As shown in FIG. 4C, the rollers (e.g., casters) 312 run along the rails 314 from their storage positions 426 to their fully open position 428, as the back door moves from the closed position 420 to the fully open position 424. In the fully open position 424, the golf ball dispenser is ready to be refilled.

Figure 4D:
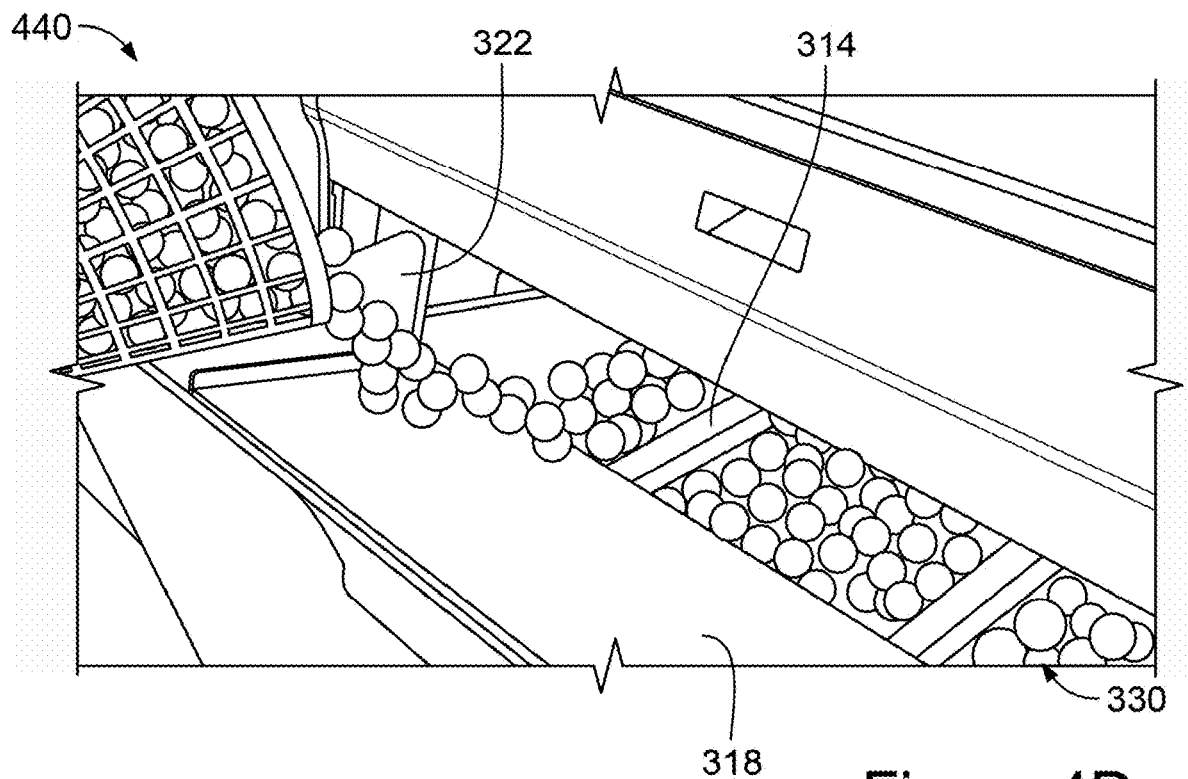
Figure 4E:
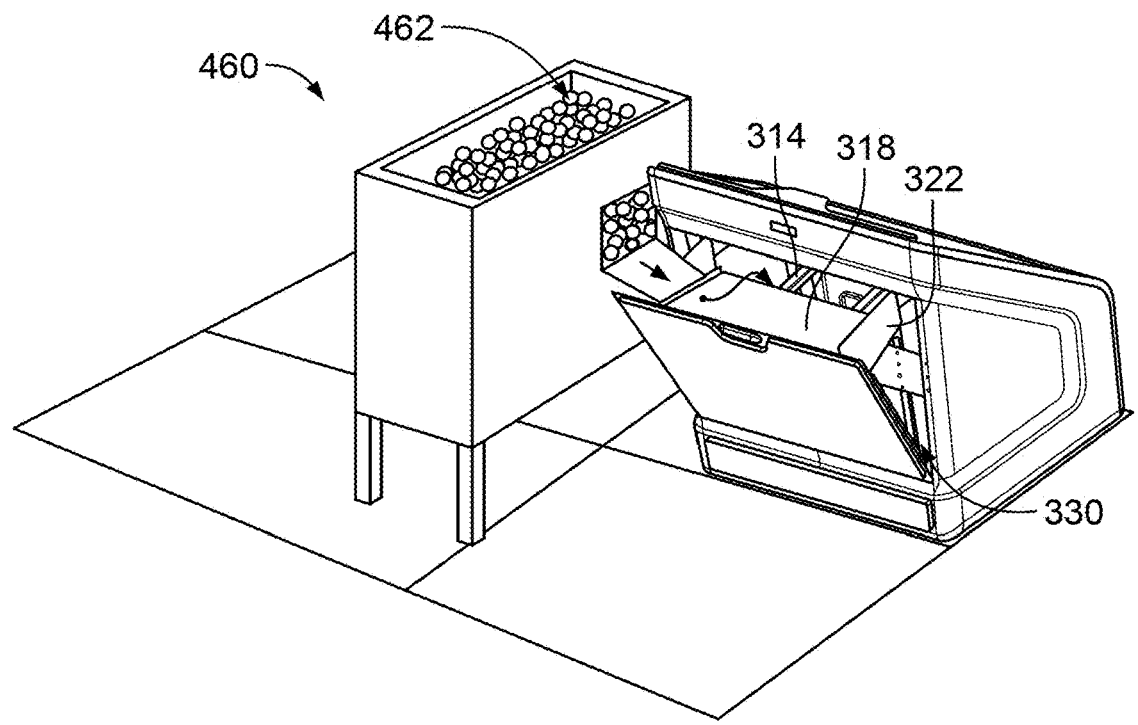

As shown in FIG. 4D, the receptacle 306 can be refilled by dumping balls 440 onto the ramp 318. The force of gravity will naturally pull the balls down the ramp 318 and into the receptacle 306; note that the rails 314 are narrow enough that the balls are unlikely to balance and come to rest on them. During this process, the wings 322 help keep the balls on their intended course into the receptacle 306. As another example, FIG. 4E shows a moveable golf ball delivery device 460, which is used to deliver golf balls 462 to the receptacle 306 by directing the golf balls 462 onto the ramp 318. Again, the force of gravity will naturally pull the balls down the ramp 318, past the rails 314, and into the receptacle 306, while the wings 322 will prevent the golf balls 462 from falling off the ramp 318.

When the refilling is completed, the back door 304 is closed, and the ramp 318 and wings 322 return to their storage positions inside the golf ball dispenser. Thus, the roller system of the ramp assemble 310 facilitates the filling of the golf ball dispenser 300, as it maximizes storage space for golf balls by enabling refill of the dispenser 300 at the upper most point of the receptacle 306 without having to take the top off the dispenser 300, and in a manner that minimizes the risk of spilling golf balls, impacting electronics, etc. The dispenser 300 can be refilled from the back rather than from the top, while also ensuring loading of the balls is from a point higher than the top of the receptacle 306, thus maximizing the number of balls that can be stored during a single refill.

Figure 5A:
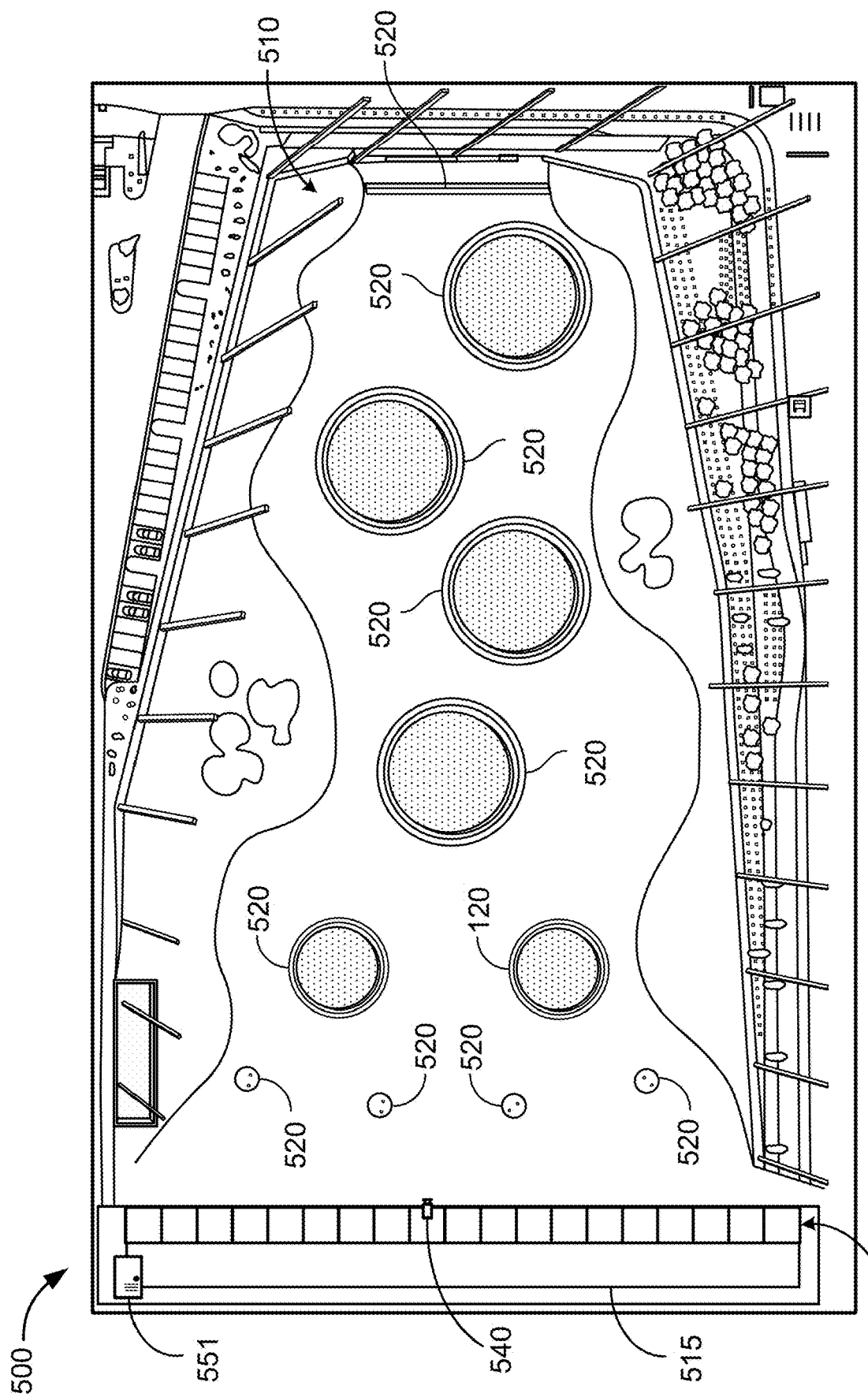
FIG. 5A shows an example of a system that can be used in combination with the golf ball dispensers of the present application.

FIG. 5A shows an example of a system 500 that can be used in combination with the golf ball dispensers of the present application. In this example, the system 500 is part of a golf facility that includes targets 520 on a golf range 510, and a building 515 including golf bays 530. The golf bays 530 can include the golf ball dispensers of the present application. In FIG. 5A, the building 515 is shown as being rectangular, but note that typical implementations will have a curved portion of the building facing the golf range 510 so the golf bays 530 form a crescent shape. The golf ball dispensers of the present application and the targets 520 can include Radio Frequency Identification (RFID) tag interrogators that read RFID equipped golf balls hit from the golf bays 530 located on more than one level of the building 515. The RFID tag interrogator in each golf ball dispenser can be positioned along the passageway from the ball receptacle to the ball outlet. Further, one or more of the targets 520 can include discrete sections of netting that funnel the golf balls into respective RFID reader boxes associated with the different sections. However, in some implementations, no such RFID tags and RFID tag interrogators are required.

The system 500 includes one or more computers 551, which are communicatively coupled (e.g., by wires, wirelessly, or both) to the golf ball dispensers in the bays 530 to control the operation of the golf ball dispensers. For example, the computer(s) 551 can be programmed to (1) present information on the embedded display device 102 for viewing by a user of the golf ball dispenser 100 (e.g., dynamically determined content or other content, such as a television show or other video data, static images, brand elements, interactive user interface screens for the game being played by the golfers using the golf ball dispenser 100, etc.), (2) use the sensor 270 to detect how full the receptacle 230 is to trigger a refill of the golf ball dispenser 200 when needed (e.g., trigger a lighting change on the golf ball dispenser 200 to alert staff that the dispenser 200 should be refilled). The one or more computers 551 can include a central computer system for the golf facility, dispenser controller(s) and/or game system computer(s).

In some implementations, at least one golf ball sensor 540 (e.g., one or more stereo camera sensors) is included in the system 500, and the computer(s) 551 use golf ball sensor(s) 540 to track the golf balls in flight (after being released from a golf ball dispenser and hit from a golf bay 530) and identify where the golf balls land on the golf range 510, with or without the use of RFID systems. Thus, the computer(s) 551 and sensor(s) 540 can form a golf ball sensor system 540, 551 that performs in flight 3D tracking of golf balls through the three dimensional space of the golf range 510. The golf range 510 can be flat or include small hills or one or more inclines, and can also include hazards, such as water and sand traps. Note that such hazards need not include actual water and sand, but can simply be colored to look like water and sand. The golf range 510 can be composed of real grass or artificial turf. Moreover, the targets can be grouped into categories that generally represent their distances from the building 515, and the targets can have various shapes, such as the circular shapes of the main targets and the rectangular shape of the trench target at the end of the range 510, as well as separate colors for each target 520 or groups of targets 520. Other shapes and sizes for the targets 520, as well as different numbers of targets 520 than shown, are also possible.

The golf ball sensor system 540, 551 can be used to identify from which of golf bays 530 the golf balls have been hit, and then present information regarding the golf ball hit from a given bay 530 on the embedded display device in the golf ball dispenser in that bay, e.g., golf ball statistics relating to the current shot in the current game and/or an animation showing the golf ball flight in a computer generated representation of the physical world of the golf range 510 and/or of a virtual world correspond to the game being played. The golf ball sensor system 540, 551 includes at least one golf ball sensor 540 and at least one computer 551 communicatively coupled with the golf ball sensor 540. The golf ball sensor 540 can be one or more sensors of one or more different types. For example, the golf ball sensor(s) 540 can be an optical sensor (e.g., a stereo camera or two cameras operated together to provide stereo vision of the golf balls in flight), a radar sensor, or a combination of these.

In some implementations, two or more stereo cameras 540 are used to track golf balls in flight in three dimensional space.

The golf ball sensor(s) 540 are communicatively coupled with one or more computers 551. In some implementations, at least one computer 551 is connected or integrated with each of two or more sensors 540 to create discrete sensor systems, which independently/separately detect and track golf balls in the three dimensional space, thus providing distinct trajectory predictions based on distinct observations of the same golf balls traveling through the three dimensional space. Such discrete golf ball sensor systems can also be communicatively coupled with a central computer system 551, e.g., one or more server computer systems, which coordinate the trajectory predictions received from the discrete golf ball sensor systems and make a final determination as to which of the golf bays 530 and which of the golf ball dispensers should be confirmed and reported as the origin for a specific golf ball being tracked. Note that the central computer(s) 551 can be part of a computer system (e.g., for the golf facility) that manages golf games and sends information about the golf shot (e.g., a simulated golf shot animation in a virtual golf game and/or a ball tracing overlay in an augmented reality golf shot viewer) to a display device associated with or embedded in the golf ball dispensers in the golf bays 530. In any case, the computer(s) 551 include at least one hardware processor and at least one memory device coupled with the at least one hardware processor, that have been built and/or programmed to perform the operations detailed in this disclosure.

Figure 5B:
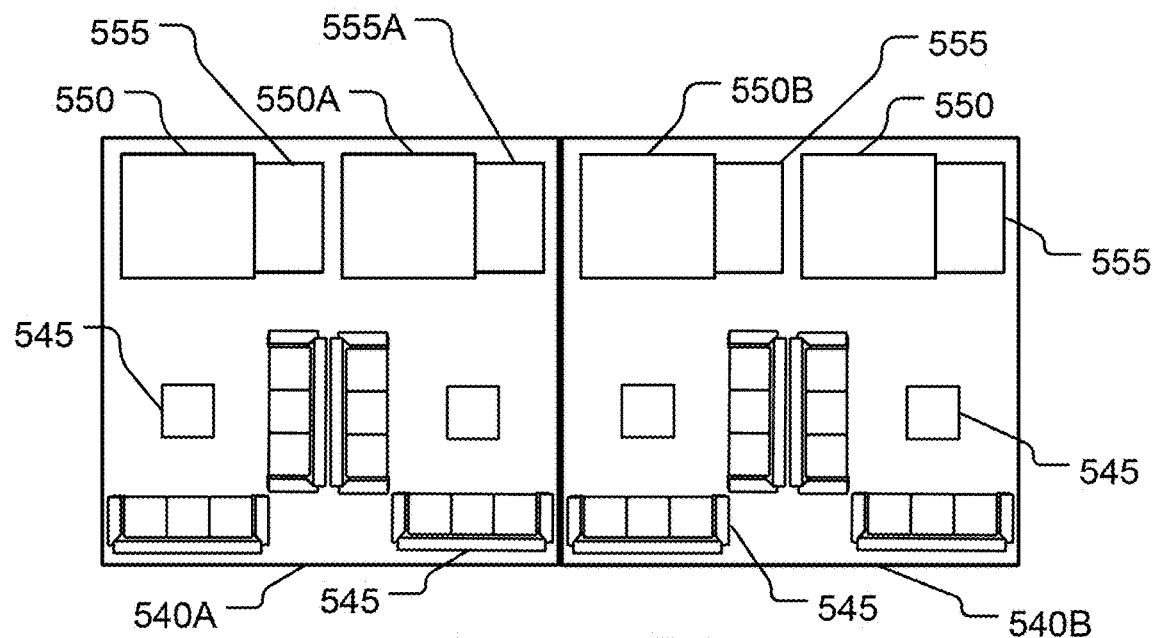
FIG. 5B shows an example of a layout for golf bays, as can be used in the system of FIG. 5A.

FIG. 5B shows an example of a layout for golf bays 540A, 540B, as can be used in the system of FIG. 5A. The golf bays 540A, 540B can include furniture 545, such as couches and tables, to facilitate dining and conversation during the game. As will be appreciated, many layouts for the furniture 545 are possible, and the furniture 545 and layout in the golf bays 540A, 540B can be designed to provide flexibility in how the golf bays 540A, 540B are assigned to one or more groups of people for playing games together or separately.

Each of the golf bays 540A, 540B can include two tee off locations, where each tee off location includes a tee area 550 and a golf ball dispenser 555. Each golf ball dispenser 555 can include any suitable combination of features described herein for a golf ball dispenser. For example, the golf balls can be collected from a central location in the building 515 and manually dropped into a receptacle 306 in golf ball dispenser 555 using the ramp assembly 310 described above. But in some implementation, the ramp assembly 310 is not used, and each golf ball dispenser 555 is directly connected with a pneumatic tube system, such that golf balls can be automatically retrieved from the targets and fed back to the players without human intervention. In either case, each of the golf ball dispensers 555 can include the embedded display device, the modular interlocking panels, the multi-layer padding, and/or other golf ball dispenser feature described in this application. In the implementations that use an embedded display device in each golf ball dispenser 555, each display device can include a touchscreen device that connects with a central computer system for the building 515 and provides the players with direct control over their game play, including selecting the type of game to play and the current player.

In any case, one or more players can step into respective tee areas 550, obtain a golf ball from a respective dispenser 555, and then hit their respective balls. In some implementations, the computer(s) 551 uses video data obtained by respective camera systems in each golf ball dispenser 555. For example, a camera system in a golf ball dispenser 555A can provide video of both a served tee area 550A and an adjacent tee area 550B. This video data can be used by the golf ball sensor system 540, 551 to help locate an initial tee off location of the golf ball, for use in 3D ball flight reconstruction and to help identify an embedded display device on which to show information regarding the golf shot, e.g., golf shot statistics and/or golf shot rendering or animation in a virtual golf game, which can include a representation of a golf course or other virtual game features. In some implementations, with or without ball flight tracking, this video data can be used by the computer(s) 551 to provide swing analysis information to the player, e.g., an instant replay of the swing on the embedded display device along with computer generated tips for how to improve your golf swing.

Figure 5C:
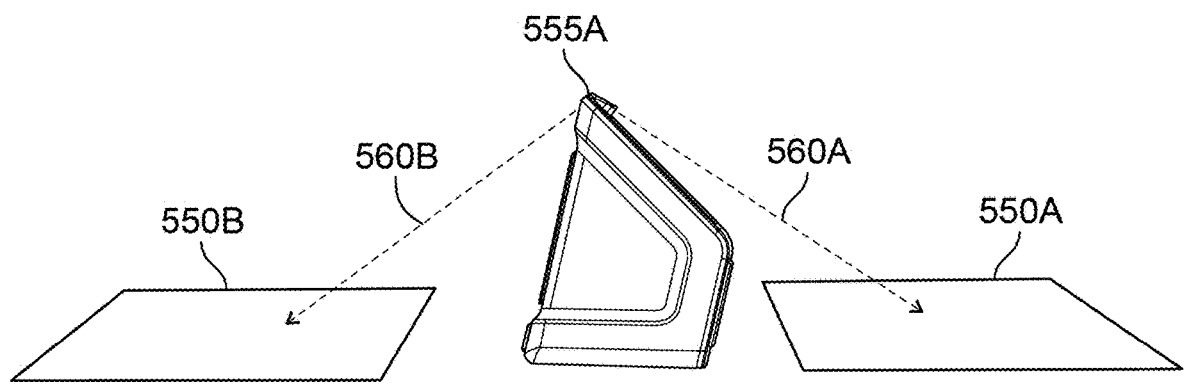
FIG. 5C shows an example of view angles for a camera system, as can be used in the golf bay layout of FIG. 5B.
Figure 5D:
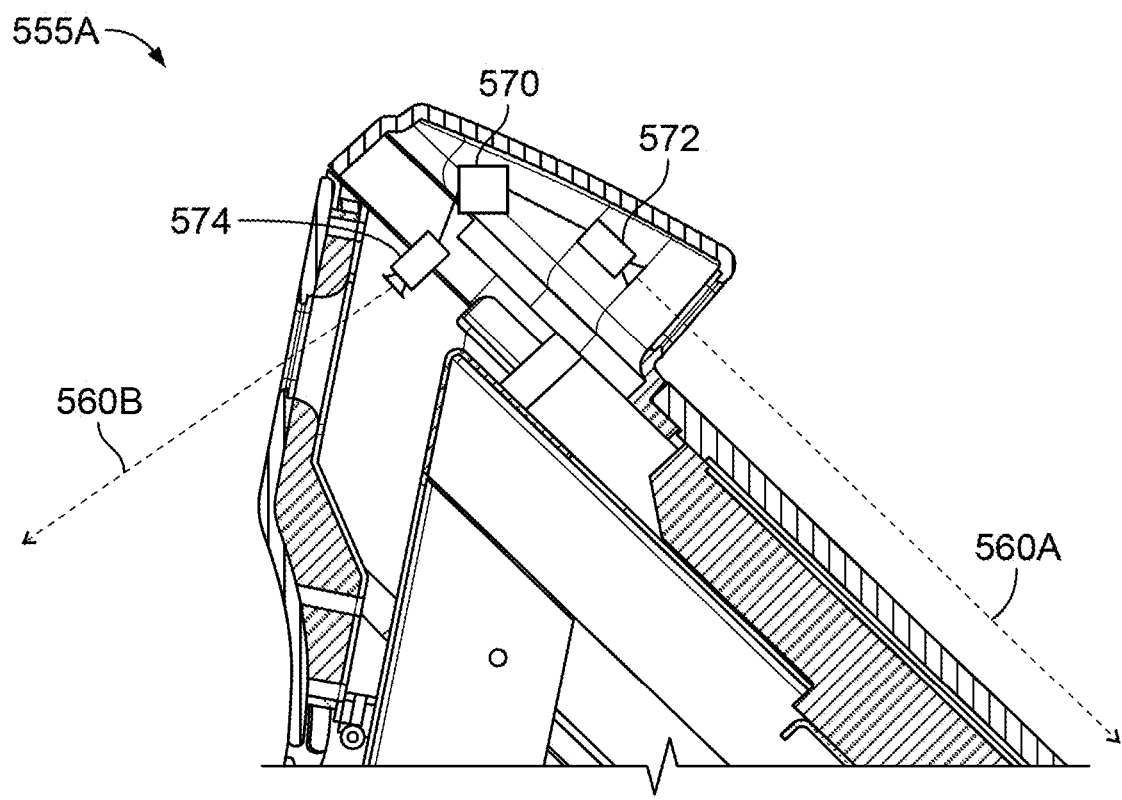
FIG. 5D is a cross section of a golf ball dispenser showing an example of the camera system, as can be used with the view angles of FIG. 5C.

FIG. 5C shows an example of view angles for a camera system in the golf ball dispenser 555A. FIG. 5C shows the golf ball dispenser 555A from the perspective of the golf range 510 looking back into the golf bays 530. Thus, the tee area 550A that is served by the golf ball dispenser 555A is now on the right, and the adjacent tee area 550B is now on the left. The camera system in the golf ball dispenser 555A provides a field of view that includes a view 560A directly to the tee area 550A, and also a field of view that includes a view 560B directly to the adjacent tee area 550B. As will be appreciated, the camera system in the golf ball dispenser 555A will thus have a clear view of the club swing of a right handed golfer in tee area 550A, and will also have a clear view of the club swing of a left handed golfer in the tee area 550B. FIG. 5D is a cross section of the golf ball dispenser 555A showing an example of the camera system that provides views 560A, 560B.

The camera system is integrated into the golf ball dispenser 555A and includes a controller 570 coupled with a first camera 572 directed toward tee area 550A, and a second camera 574 directed toward tee area 550B. Each camera 572, 574 can be a wide angle camera that is positioned to capture a full swing of a golf club, including impact of the golf club with the golf ball when the golf ball is hit from the tee area, e.g., for use in generating information for display on the display device integrated with the golf ball dispenser 555A or to a third party monitor/video playback device anywhere else, including over the Internet. In some implementations, a camera system 570, 572 and/or 570, 574 includes a video recording housing, a detachable wide-angle lens, a video grabber to process the video, and a computer programmed with software that processes the video and relays feedback.

Note that the placement and angles of the cameras 572, 574 within the golf ball dispenser 555A, as well as the size and position of the golf ball dispenser 555A in relation to tee areas 550A, 550B, provide clear views through the holes in the top panel and the upper back door that allow simultaneous capture of two golf swings (left and right) in adjacent golf bays/tee areas. Moreover, the spacing to the tee areas 550A, 550B for the front and back cameras 572, 574 can be set so as to allow for the video capture to work for a left handed golfer without changing the software for differences in viewing distance. And each of the cameras 572, 574 can have enough aperture to capture both the impact of the club with the ball in the tee area and the full range of swing of the club, regardless of whether the golfer is left handed or right handed.

Figure 6:
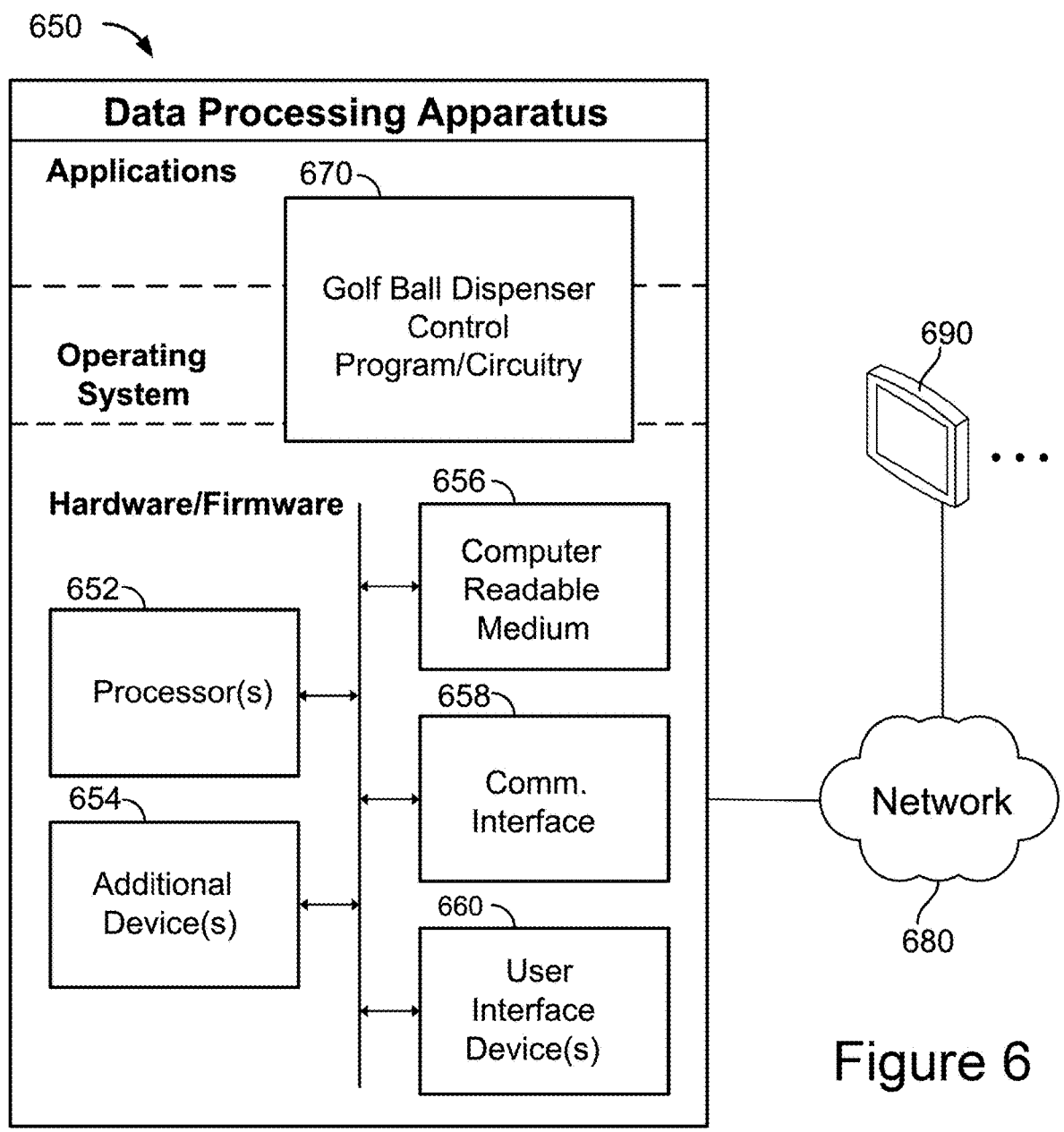
FIG. 6 is a schematic diagram of a data processing system.

FIG. 6 is a schematic diagram of a data processing system including a data processing apparatus 650 that can be used to control one or more golf ball dispensers as described in this application. The data processing apparatus 650 can be connected with one or more computers 690, display devices 690 or both, through a network 680. While only one computer is shown in FIG. 6 as the data processing apparatus 650, multiple computers can be used.

The data processing apparatus 650 can include various software modules, which can be distributed between an applications layer and an operating system. These can include executable and/or interpretable software programs or libraries, which can include a program 670 that operates one or more golf ball dispensers. The number of software modules used can vary from one implementation to another, and the software modules can be distributed on one or more data processing apparatus connected by one or more computer networks or other suitable communication networks. Moreover, in some cases the functions described are implemented (in part or fully) in firmware and/or hardware of the data processing apparatus 650 to increase the speed of operation. Thus, program(s) and/or circuitry 670 can be used to implement the golf ball dispenser control operations described in this application.

The data processing apparatus 650 can include hardware or firmware devices including one or more hardware processors 652, one or more additional devices 654, a computer readable medium 656, a communication interface 658, and one or more user interface devices 660. Each processor 652 is capable of processing instructions for execution within the data processing apparatus 650. In some implementations, the processor 652 is a single or multi-threaded processor. Each processor 652 is capable of processing instructions stored on the computer readable medium 656 or on a storage device such as one of the additional devices 654. The data processing apparatus 650 uses its communication interface 658 to communicate with one or more computers/display devices 690, for example, over a network 680. Thus, in various implementations, the processes described can be run in parallel or serially, on a single or multi-core computing machine, and/or on a computer cluster/cloud, etc.

Examples of user interface devices 660 include a display device, a touchscreen display device, a camera, a speaker, a microphone, a tactile feedback device, a keyboard, and a mouse. The data processing apparatus 650 can store instructions that implement operations detailed in this disclosure, for example, on the computer readable medium 656 or one or more additional devices 654, such as one or more of a floppy disk device, a hard disk device, an optical disk device, a tape device, and a solid state memory device. In general, computer readable medium 656 and one or more additional devices 654 storing instructions are examples of at least one memory device encoding instructions configured to cause at least one hardware processor to perform operations as detailed in this disclosure.

The additional device(s) 654 can also include one or more sensors 540. The one or more sensors 540 can also be located remotely from the data processing apparatus 650, and the data from such sensor(s) 540 can be obtained using one or more communication interfaces 658, such as interfaces for wired or wireless technologies. Such communication interface(s) 658 can also be used to communicate information to display devices embedded in the golf ball dispenser(s) and/or control signals to light source(s) in the golf ball dispenser(s), and/or other data to another computer system. For example, two or more data processing apparatus 650 can be discrete golf ball sensor systems that independently track golf balls in a three dimensional physical space, report their results to another data processing apparatus 650 that decides which result to use and which tee area to identify as the origin for the golf shot and thus to which golf display device in which golf ball dispenser to send information about the golf shot in the game being played.

Figure 7:
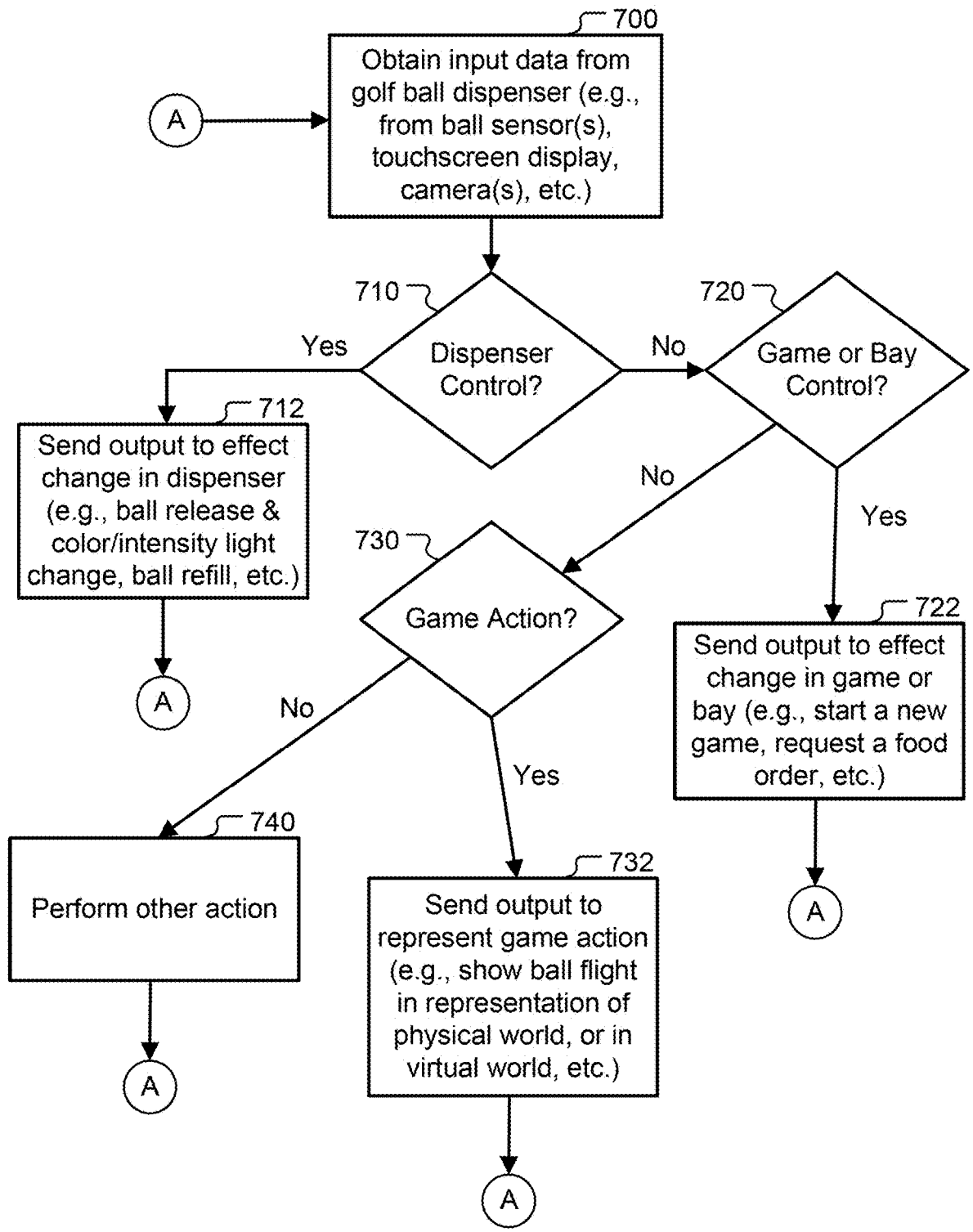
FIG. 7 is a flowchart showing an example of processes that can be implemented in combination with the golf ball dispensers of the present application.

FIG. 7 is a flowchart showing an example of processes that can be implemented in combination with the golf ball dispensers of the present application using the computer systems described above. Input data is obtained 700 from a golf ball dispenser. For example, the input data can include a fill level signal from sensor 270, input signals from a touchscreen display device 102, and/or video data from a camera 572, 574. A check 710 can be made to determine if the input data relates to control of the golf ball dispenser. If so, the input data is processed and output is sent 712 to effect a change in the dispenser. For example, if the input signal is the detection by a proximity sensor (e.g., an infrared sensor) of a club being waved in front of the outlet 104, this can be processed to trigger a ball release by the gateway 250 as well as the color and/or intensity change of the light source 240, as described above. In addition, the control of the dispenser can be tied into the game played, such as when the final color of the light source 240 (or a final flashed color of the light source 240) is selected to indicate a target to be hit with the dispensed golf ball (e.g., a physical target on a golf range in front of the tee area and the golf ball dispenser, or a virtual target in the game being played from the tee area served by the golf ball dispenser). As another example, if the input signal is the fill level signal from sensor 270, this can be processed to determine if the dispenser 100 needs to be refilled, and if so, a signal is sent to change the color of the right side logo 242R.

Further, a check 720 can be made to determine if the input data relates to control of the game or the golf bay. If so, the input data is processed and output is sent 722 to effect a change in the game of golf bay. For example, the input data can be a new game selection detected on the touchscreen display device 102, a new game gesture detected with the camera 572, or a face of a player (recently assigned to the golf bay) detected by facial recognition software, and the output can be to a game control computer, which starts a new game and updates the display device 102 accordingly. As another example, the input data can be a food or drink order request detected on the touchscreen display device 102, or a food or drink order gesture detected with the camera 572, and the output can be to a wait staff management computer, which sends a signal to a mobile device held by the person responsible for the golf bay in which the golf bay dispenser is located.

In addition, a check 730 can be made to determine if the input data relates to a game action. If so, the input data is processed and output is sent 732 to represent the game action. For example, the input can be sensor data received by the golf ball sensor system 540, 551, which can process this sensor data to detect and track the 3D trajectory of the golf ball hit from the tee area served by the golf ball dispenser, and the output can be a visualization on the display device embedded in the golf ball dispenser that shows the ball flight in a representation of the physical world (e.g., the golf range 510, or a real world golf course) or of a virtual world (e.g., a game world having a 3D space registered with that of the golf range 510).

In addition, as noted above, lighting control can be synchronized across multiple golf ball dispensers located at a golf facility. In some implementations, each lighting controller can have a local timebase, and the local timebases for all the dispensers can be synchronized via a network synchronization protocol such as NTP (Network Time Protocol). Lighting effects scripts can be executed by the controller which determines the color and intensity of the lighting device and how they change over time. Lighting effects scripts can be sent to the controller for execution by an outside entity such as a centralized server or personal computer. Multiple lighting effects scripts can be stored on each controller and be scheduled for execution by the outside entity.

Script execution schedule can be changed at any time by the outside entity. The currently executing lighting effects script can be preempted due to a local event (originating from within the dispenser) or a remote event; preemption causes the running script to be halted and immediately replaced by an alternate script; normal operation may be restored when the alternate script finishes; the preempted script resumes at the point it would have been had it not been preempted rather than the point at which it left off so as to maintain synchronicity with other controllers or dispensers. Scripts can be mainly comprised of state transition instructions; each instruction includes an initial state (optionally automatically derived from the end of the previous transition), a final state, a transition duration, and a transition function (linear being the most basic example). Scripts can include control instructions for repetition of part of the script.

Scripts can also include instructions that define how transitions between them and other scripts are to be handled when they are preempted. Scripts can be configured to execute only once or to automatically restart. A script synchronizes its starting point to a modulo of the timebase plus an offset; the base time modulus is the script's repetition period. Scripts set to run only once can be either asynchronous to the timebase or synchronized to an absolute time marker reference in the timebase. Script preemption events can be synchronized between controllers and dispensers by scheduling the transition from the currently running script to a new one on an absolute or relative (to the script execution repetition cycle) marker reference of the timebase; the script being transitioned to can have been transferred to the controller in advance.

Figure 8A:
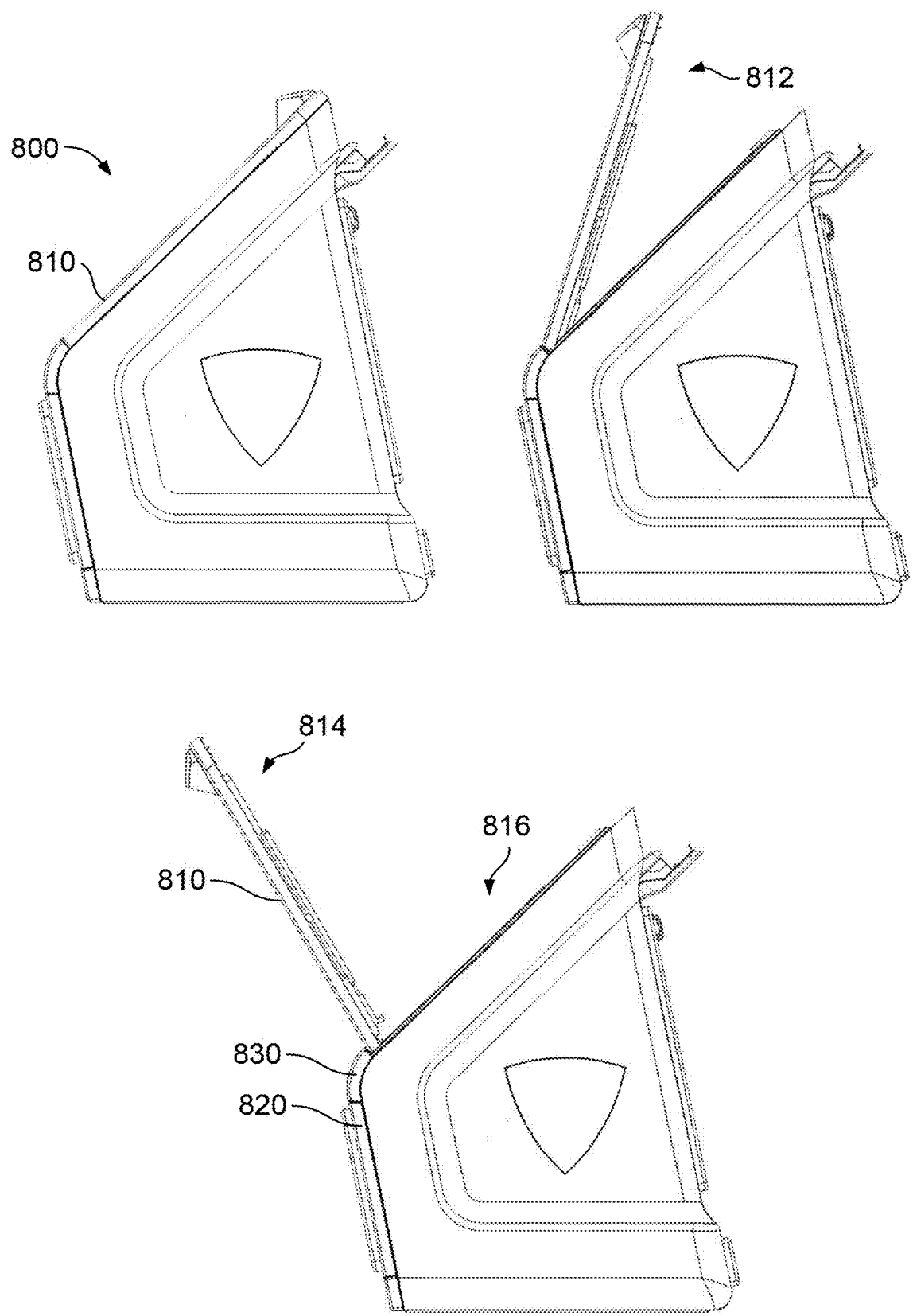
FIG. 8A shows another example of a golf ball dispenser, which has an angled top portion that is attached through a hinge, which allows the top of the golf ball dispenser to be tilted upwards.

FIG. 8A shows another example 800 of a golf ball dispenser. The golf ball dispenser 800 can include any combination of feature described above for the golf ball dispensers 100, 200, 300. The ball dispenser 800 includes an angled top portion 810 that is attached through a hinge with the rest of the ball dispenser 800. Thus, the angled top portion 810 of the ball dispenser 800 can be lifted 812 (tilted upwards) to a fully open position 814, thereby providing ready access 816 (from the top) to the inside of the ball dispenser 800. For example, the top 810 of the ball dispenser 800 can be lifted to provide easy access for cleaning the display device inside the ball dispenser 800 and a backside of an impact resistant shield 115 held by the top 810. Moreover, lifting the top 810 can facilitate repair or replacement of the display device inside the ball dispenser 800. In some implementations, the top 810 can be lifted off once in the open position 814, and in some implementations, the hinge holds the top 810 in place such that the top can be allowed to rest in the open position 814 while any cleaning or servicing is performed.

In some implementations, the angled top portion 810 includes a top panel, such as the top panel 110 described above. In some implementations, the top portion of the ball dispenser 800 includes two distinct exterior pieces, namely, a top panel 810, which can receive an impact resistant shield 115 in a recess defined in the top panel 810 just as done for top panel 110 (see FIG. 1D) and a curved ("waterfall") panel 830 located between the top panel 810 and a front panel 820.

The top panel 810 can be coupled with the curved panel 830 or with the metal frame 108 through a hinge, which allows the top panel to be tilted upwards along with the impact resistant shield 115, thereby providing access to the display device 102.

Figure 8B:
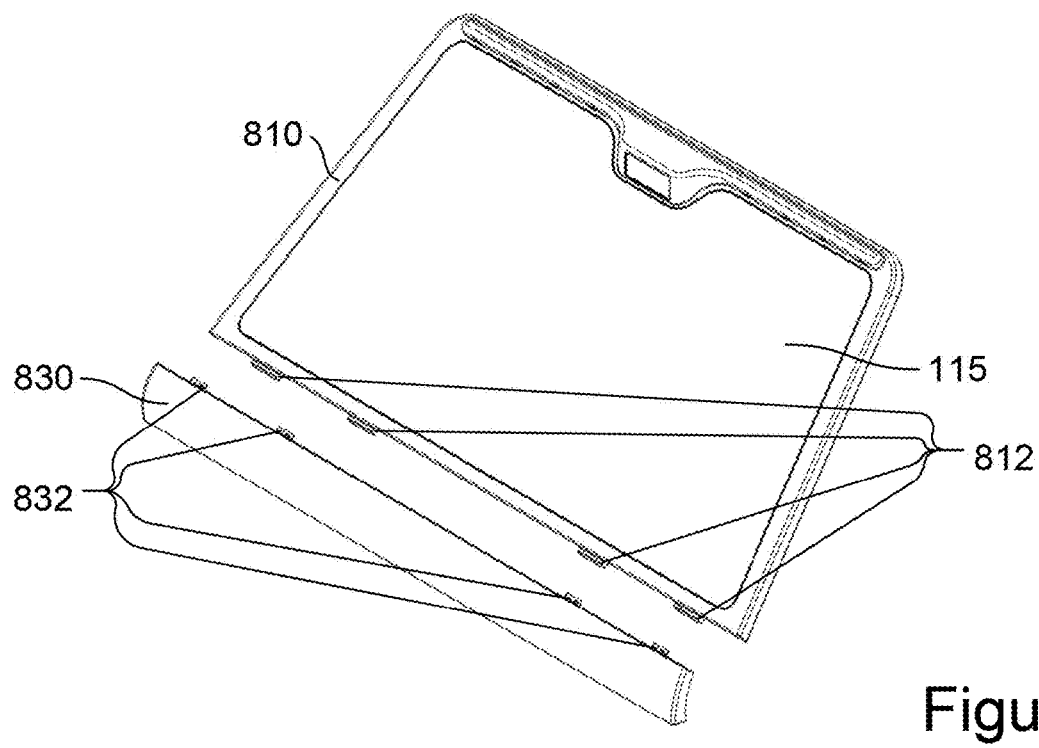
FIG. 8B shows an example of a hinge for the top panel of the ball dispenser of FIG. 8A.

FIG. 8B shows an example of a hinge for the top panel 810 of the ball dispenser 800. The hinge in this example is composed of at least one tab 812 (included as part of the top panel 810) and at least one slot 832 (included as part of the curved panel 830). The slot(s) 832 are configured and arranged to receive the tab(s) 812 and allow the top panel 810 to be tilted upwards along with the impact resistant shield 115, thereby providing access to the display device. Other hinge structures are also possible, such as a swivel or a pivot; note that there is no requirement for rotation about a central axis. Further, using a tab and slot hinge (or similar tongue and groove structure) is advantageous in that the top panel 810 can be tilted upwards (without being removed) for ease of cleaning and maintenance, e.g., repair or replacement of the display device 102, and the top panel 810 is also readily removable without the use of tools. Moreover, the overlapping tab & slot (or tongue & groove) design keeps the top portion of the ball dispenser water resistant, e.g., up to IP54.

Figure 8C:
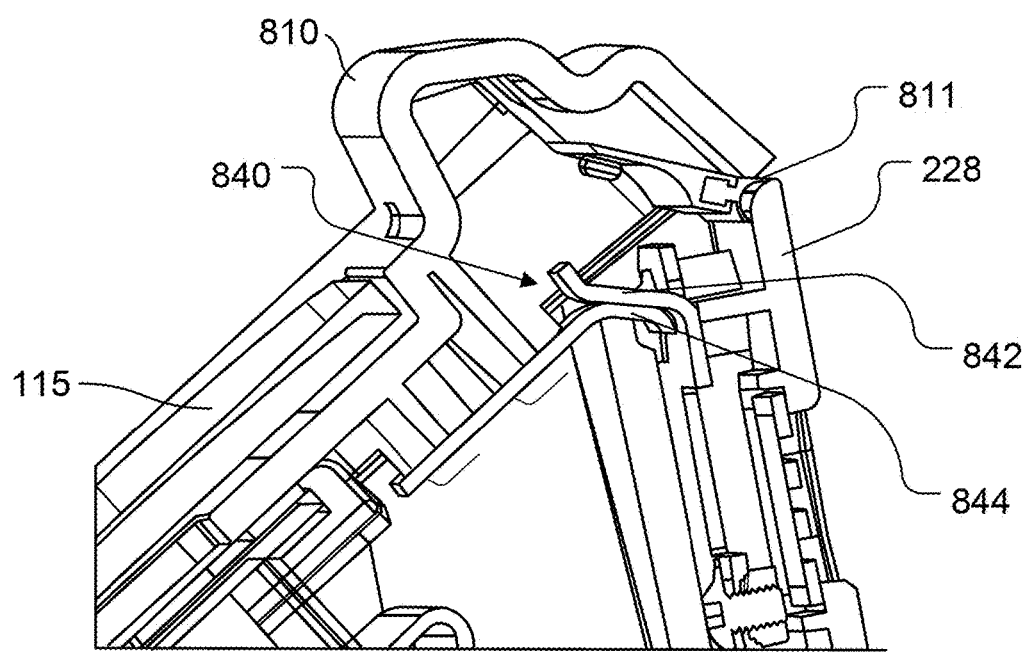
FIG. 8C shows an example of an internal latching structure for the top panel of the ball dispenser of FIG. 8A.

In addition, in order to hold the top panel 810 in place during normal operation, at least one back door 124, 128, 224, 228, 304 of the ball dispenser 800 can include a catch configured to hold the top panel 810 closed. For instance, FIG. 8C shows an example of a latching structure 840 for the top panel 810 of the ball dispenser 800. In this example, the upper back door 228 includes a tab 842 configured and arranged to interact with and lock (through friction) against a tab 844 coupled with the top panel 810. Together, the tabs 842, 844 form the catch 840, such that, when the upper back door 228 is closed, the tab 842 prevents the tab 844 (and thus the top panel 810) from lifting upward on the hinge, but when the upper back door 228 is open, the tab 844 (and thus the top panel 810) is free to be raised. Various other latching structures can be used as the catch, including various types of spring latches, hooks, snaps, clasps, or fasteners.

Moreover, a collapsing weather stripping piece 811 can be included to prevent water from getting into the ball dispenser 800 (e.g., from rain, snow or other precipitation) through the seam that runs between the top of the upper back door 228 and the top panel 810, thus helping to maintain an ingress protection rating of up to IP54. Further, in addition to handling water, the ball dispenser 800 can be designed to handle hot environments, e.g., from direct sun exposure. Thus, in some implementations, the ball dispenser 800 includes a blower or fan located inside the exterior panels of the golf ball dispenser 800.

Figure 8D:
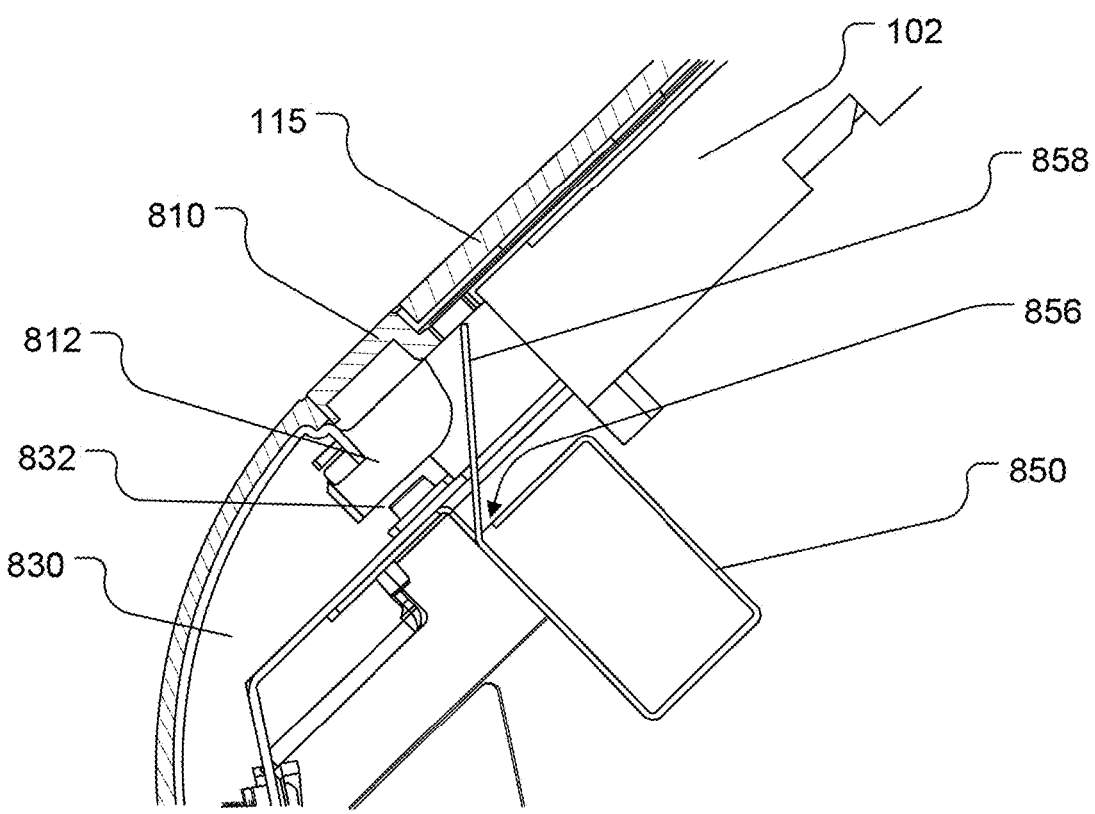
FIGS. 8D-8J show examples of various structures that can be included in any of the ball dispensers described in this application.
Figure 8E:
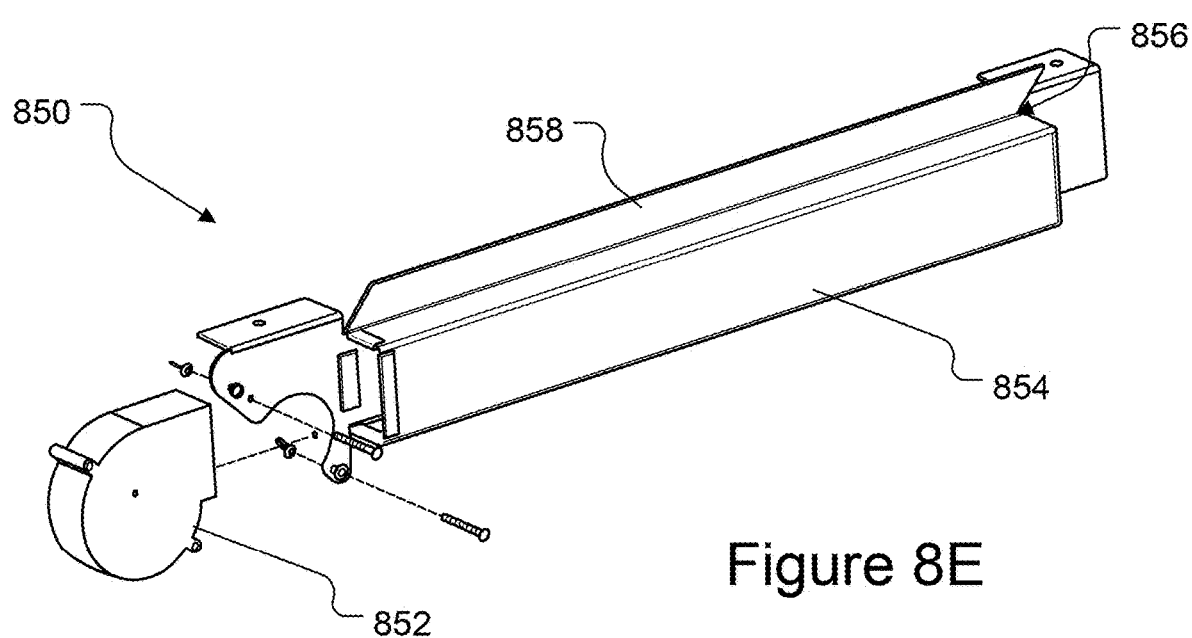

FIGS. 8D & 8E show an example of a blower assembly 850 (i.e., a blower/fan assembly 850) for the ball dispenser 800. FIG. 8D is a cross-sectional view showing the blower assembly 850 in place within the exterior panels of the golf ball dispenser 800, where the blower assembly 850 is configured and arranged to direct air at the display device 102. FIG. 8E is a perspective view of the blower assembly 850. As shown, the blower/fan assembly 850 can include a blower/fan 852 and a surface 854 (e.g., a metal or plastic structure) that is configured and arranged to shape the air into a curtain of air, by forcing the air into an enclosed space that runs most of the width of the ball dispenser 800 (e.g., at least as wide as the display device 102) where the only outlet of that enclosed space is an opening 856, which can also be long enough to extend across most of the width of the ball dispenser 800 (e.g., at least as wide as the display device 102). After passing through the opening 856, the air is guided by a surface 858 to the space between the display device 102 and the back sides of the top panel 810 and the shield 115.

Note that the gasket 117 is not included in these implementations, and so the curtain of air passes between the display device 102 and the impact resistant shield 115. Nonetheless, a similar gasket can be included between the shield 115 and the top panel 810, e.g., around the perimeter of the impact resistant shield 115, as needed. In some implementations, the thickness of the impact resistant shield 115 and/or the recess in the top panel 810 that receives the impact resistant shield 115 is made with dimension(s) that ensure enough air will pass over the front of the display device 102 to keep the display device 102 sufficiently cool during operation. In some implementations, the recess in the top panel 810 includes two or more cutout portions (or indents) that ensure there is sufficient space between the top panel 810 and the display device 102 (i.e., sufficient clearance in one or more places where the recess defines an opening through which the display device 102 can be viewed) for the air to both enter and exit the space between the top panel 810 and the impact resistant shield 115.

Figure 8F:
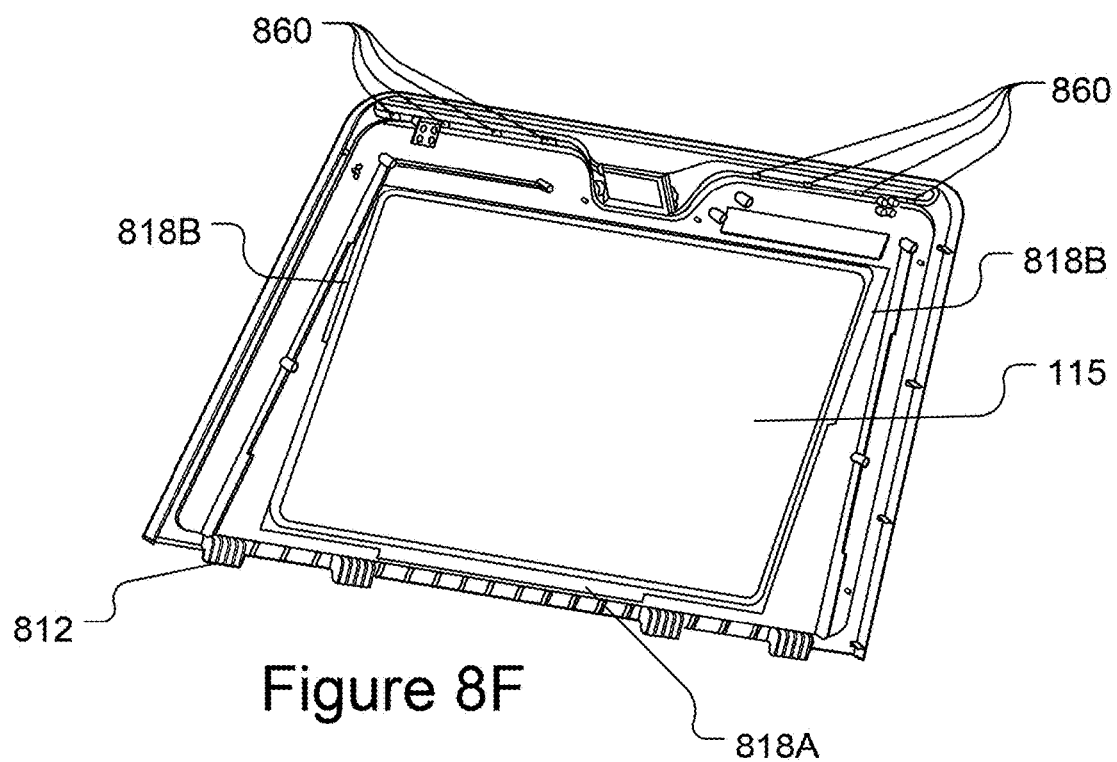

For example, FIG. 8F shows an underside of the top panel 810. In this example, the top panel 810 includes an indented portion 818A at the bottom, where the indented portion 818A provides an opening for at least a portion of the curtain of air passing out of the opening 856 of the blower assembly 850, and along the surface 858, to flow between the edge of the top panel 810 (which holds the impact resistant shield 115 in place above the display device 102) and the edge of the display device 102, and thereby flow above the display device 102. Likewise, the top panel 810 includes indented portions 818B at the top sides of the panel 810, where the indented portions 818B provide an opening for the curtain of air passing over the display device 102 to flow around the edges of the display device 102 and back into the main interior of the ball dispenser 800.

Since the majority of heat generated inside the ball dispenser 800 comes from display device 102 (e.g., the light emitting diodes (LEDs) of the display device) and the solar exposure that the display device 102 receives through the shield 115, cooling the front of the display device 102 (e.g., cooling the LEDs) in addition to (or in alternative to) cooling the back of the display device 102 facilitates long periods of operation of the ball dispenser 800 without significant risk of damage to the display device 102 or other components of the ball dispenser 800.

Note that the air need not be actively cooled in order to achieve the cooling effect, but it may be preferable to ensure that fresh air is available for the cooling, rather than simply recycling air inside the ball dispenser 800. Thus, in some implementations, one or more outflow vents 860 are included near the top of the ball dispenser 800 to allow hot air to escape. One or more inflow vents can also be included in the ball dispenser 800. However, in some implementations, no designated inflow vents are needed since there can be gaps between the exterior panels of the ball dispenser 800 and/or at the bottom of the ball dispenser 800 (where the front, back and side panels get close to, but do not touch the ground) to provide sufficient air intake.

Figure 8G:
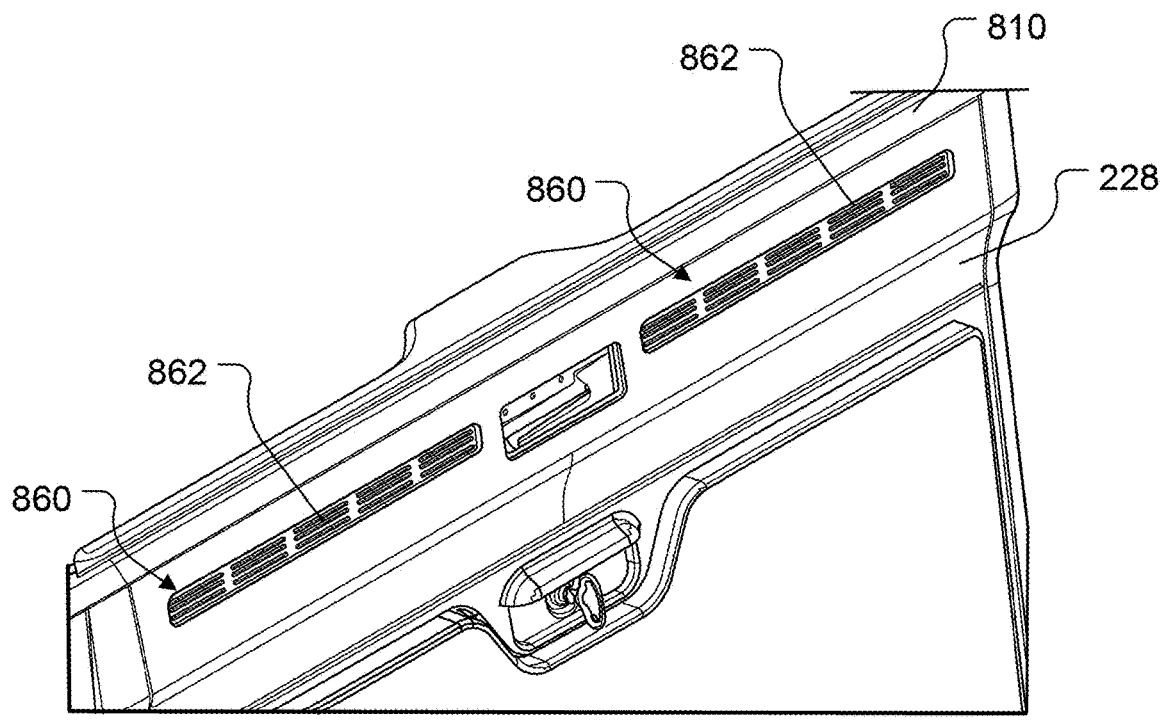

The outflow vent(s) 860 can be included in the top panel 810 (as shown in FIG. 8F) and/or in one or more other exterior panels of the ball dispenser 800. Preferably, the outflow vent(s) 860 are located near the top of the ball dispenser 800, thus facilitating natural convection and release of heated air from within the dispenser 800. Moreover, the outflow vent(s) 860 can include waterproof, breathable fabric (e.g., PTFE (polytetrafluoroethylene) or TPU (thermoplastic polyurethane) or another, similar type of material) which ensures the desired water resistance, e.g., an ingress protection rating of up to IP54, is maintained, thus protecting the internal components (e.g., electronics) of the ball dispenser 800. For example, FIG. 8G shows the upper back door 228 with outflow vents 860 included therein, along with waterproof, breathable fabric 862 that allows air to pass out of the vents 860 but prevents water from passing through the vents 860 and into the interior of the dispenser 800.

Further, as noted above, the top portion of the ball dispenser 800 can include two distinct exterior pieces: the top panel 810 and the curved panel 830. The curved panel 830 can be attached (e.g., bolted) to the metal frame 108, and the top panel 810 can be attached with the curved panel 830, e.g., by inserting the tabs 812 into the slots 832. By using separate pieces 830, 810 instead of a single piece 110, these parts 830, 810 can be separately repaired or replaced, which can save costs over time for operation of the ball dispenser 800. Moreover, these parts 830, 810 can readily be made of different materials, e.g., metal for the core of the curved panel 830 and plastic for the top panel 810.

The vast majority of ball strikes on the dispenser (i.e., when the golfer hits the ball poorly and the ball then hits the dispenser) hit the front side, which includes the front panel 820 and the waterfall 830. The front panel 820 can be constructed from separate pieces that attach with each other, such as described above for front panel 220. Moreover, the curved panel 830 can likewise be constructed from separate pieces that attach with each other, thus helping to prevent breakage and/or damage to the waterfall 830.

Figure 8H:
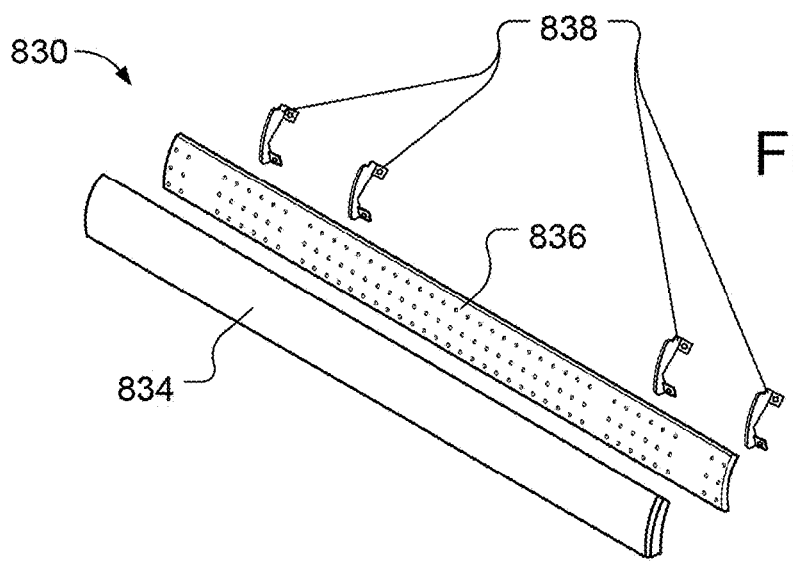

FIG. 8H shows an example of the curved ("waterfall") panel 830 of the ball dispenser 800. The curved panel 830 includes a metal plate 836 (e.g., steel) and a rubberized covering 834, which slows incoming golf balls and prevents aggressive ricochets. The metal plate 836 can be attached to the metal frame 108 using brackets 838. Making the waterfall 830 out of a metal plate 836 combined with a rubberized covering 834 dampens ball strikes and decreases the chance of damage to, or breakage of, the waterfall 830. A similar trim piece can also be added to the front of the ball dispenser 800.

Figure 8I:
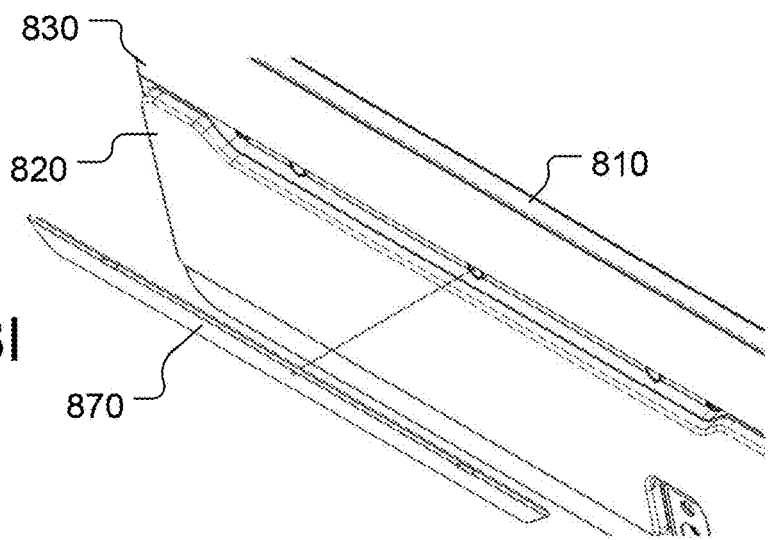
Figure 8J:
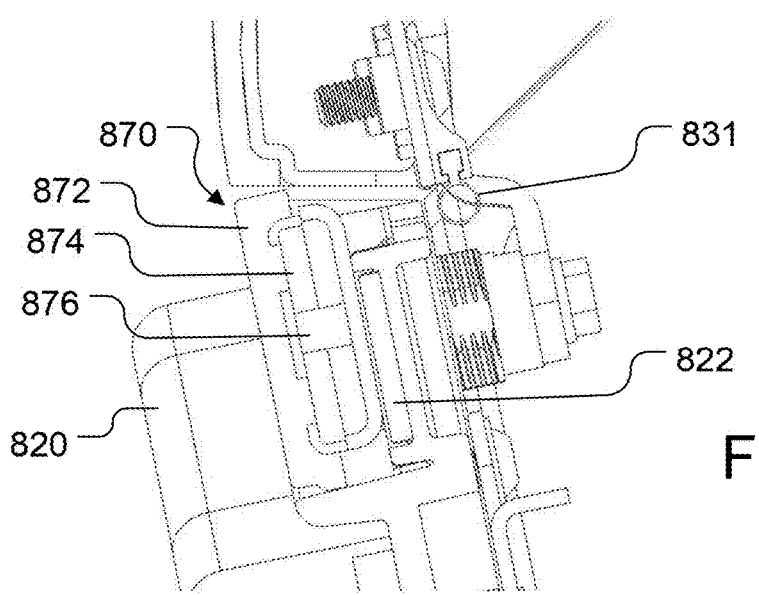

FIG. 8I shows the front of the ball dispenser 800 with a trim piece 870 to be located between the curved panel 830 and the front panel 820. In some implementations, the trim piece 870 attaches to the front panel 820, as shown in FIG. 8J, which is a cross-sectional view. The trim piece 870 can be made out of a metal plate 874 combined with a rubberized covering 872. In addition, the trim piece 870 can attach to the front panel 820 using magnetic forces. For example, the trim piece 870 can include one or more magnets 876 positioned to interact with one or more magnets 822 included in the front panel 820.

The trim piece 870 can serve to protect the lock(s) that retain the front panel 820 to the metal frame 108, as well as potentially some otherwise exposed edges of the front panel 820. Similar to the waterfall piece 830, the trim piece 870 can provide this protection with a steel core 874 and an overmolded, rubberized outer covering 872, which slows incoming golf balls and prevents aggressive ricochets. Moreover, the use of a magnetic coupling facilitates ease of maintenance since the lock(s) that retain the front panel 820 to the metal frame 108 can be readily accessed even though they are also protected from ball strikes by the trim piece 870. The magnet(s) 876, 822 can be made strong enough to hold the trim piece 870 against the front panel 820, but weak enough that a person can readily pull the trim piece 870 off, thus exposing the lock(s) that retain the front panel 820 to the metal frame 108.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A system comprising:
   a golf range;
   targets on the golf range;
   a building including golf bays including golf ball dispensers, wherein each of the golf ball dispensers is a golf ball dispenser that is associated with a golf bay and comprises
      a receptacle configured to hold multiple golf balls,
      a passageway connecting an outlet of the golf ball dispenser with the receptacle,
      a gateway coupled between the passageway and the receptacle, the gateway being configured to allow a golf ball to pass into the passageway, and
      a display device embedded in the golf ball dispenser;
   at least one golf ball sensor;
   one or more computers communicatively coupled with the at least one golf ball sensor and the golf ball dispensers, the one or more computers being configured to
      track the golf ball in flight on the golf range,
      identify where the golf ball lands on the golf range,
      identify the golf bay from which the golf ball was hit, and
      present information, regarding the golf ball hit from the golf bay, on the display device of the golf ball dispenser associated with the golf bay, the information being in accordance with where the golf ball lands on the golf range;
   wherein the golf ball dispenser comprises at least one outflow vent located so as to facilitate natural convection and release of heated air from within the golf ball dispenser; and
   wherein the golf ball dispenser comprises a waterproof, breathable fabric that allows air to pass out of the at least one outflow vent but prevents water from passing through the at least one outflow vent and into an interior of the golf ball dispenser.

2. The system of claim 1, wherein the at least one golf ball sensor comprises a radar sensor.

3. The system of claim 1, wherein the at least one golf ball sensor comprises one or more stereo camera sensors.

4. The system of claim 1, wherein the at least one golf ball sensor comprises a combination of a radar sensor and an optical sensor.

5. The system of claim 1, wherein the one or more computers are configured to present golf shot statistics on the display device of the golf ball dispenser associated with the golf bay.

6. The system of claim 1, wherein the one or more computers are configured to present an animation showing the golf ball in flight on the display device of the golf ball dispenser associated with the golf bay.

7. The system of claim 6, wherein the one or more computers are configured to present the animation in a computer generated representation of the physical world, the computer generated representation being shown on the display device of the golf ball dispenser associated with the golf bay.

8. The system of claim 6, wherein the one or more computers are configured to present the animation in a computer generated representation of a virtual world, the computer generated representation being shown on the display device of the golf ball dispenser associated with the golf bay, and the virtual world corresponding to a game being played.

9. The system of claim 6, wherein the one or more computers are configured to present the animation in a virtual world using golf ball flight characteristics determined from sensor data of the golf ball's actual flight in the real world.

10. The system of claim 6, wherein the animation is a simulated golf shot animation in a virtual golf game.

11. The system of claim 1, wherein the golf ball dispenser comprises:
    a back door; and
    a ramp positioned between the back door and the receptacle, wherein each of two sides of the ramp are bent upward.

12. The system of claim 11, wherein the golf ball dispenser comprises a hinge that couples the ramp with the back door, such that the ramp extends out a back of the golf ball dispenser when the back door is opened.

13. The system of claim 1, wherein the gateway comprises a screw inside a hopper underneath an opening in a bottom portion of the receptacle.

14. The system of claim 13, wherein the golf ball dispenser comprises a steel frame positioned around the opening and between the bottom portion of the receptacle and the hopper containing the screw.

15. A system comprising:
    a golf range;
    targets on the golf range;
    a building including golf bays including golf ball dispensers, wherein each of the golf ball dispensers is a golf ball dispenser that is associated with a golf bay and comprises
       a receptacle configured to hold multiple golf balls,
       a passageway connecting an outlet of the golf ball dispenser with the receptacle, a gateway coupled between the passageway and the receptacle, the gateway being configured to allow a golf ball to pass into the passageway, and a display device embedded in the golf ball dispenser;

at least one golf ball sensor;

one or more computers communicatively coupled with the at least one golf ball sensor and the golf ball dispensers, the one or more computers being configured to track the golf ball in flight on the golf range, identify where the golf ball lands on the golf range, identify the golf bay from which the golf ball was hit, and present information, regarding the golf ball hit from the golf bay, on the display device of the golf ball dispenser associated with the golf bay, the information being in accordance with where the golf ball lands on the golf range;

wherein the at least one golf ball sensor is at least two golf ball sensors, the one or more computers are three or more computers, at least a first of the at least two golf ball sensors is connected or integrated with at least a first of the three or more computers to create a first discrete sensor system, at least a second of the at least two golf ball sensors is connected or integrated with at least a second of the three or more computers to create a second discrete sensor system, and at least a third of the three or more computers is configured to coordinate discrete trajectory predictions received from the first discrete sensor system and the second discrete sensor system; and make a final determination as to which of the golf bays and which of the golf ball dispensers is confirmed and reported as the origin for a specific golf ball being tracked.

16. The system of claim 15, wherein the at least a third of the three or more computers is part of a computer system that manages golf games and sends the information for presentation on the display device of the golf ball dispenser associated with the golf bay, the information being a simulated golf shot animation in a virtual golf game.

17. The system of claim 15, wherein the three or more computers are configured to present a visualization on the display device of the golf ball dispenser associated with the golf bay, wherein the visualization shows the golf ball in flight on the golf range or on a golf course.

18. The system of claim 15, wherein the three or more computers are configured to present a visualization on the display device of the golf ball dispenser associated with the golf bay, wherein the visualization shows the golf ball in flight in a game world registered with the golf range.

19. A system comprising:

a golf range;

targets on the golf range;

a building including golf bays including golf ball dispensers, wherein each of the golf ball dispensers is a golf ball dispenser that is associated with a golf bay and comprises a receptacle configured to hold multiple golf balls, a passageway connecting an outlet of the golf ball dispenser with the receptacle, a gateway coupled between the passageway and the receptacle, the gateway being configured to allow a golf ball to pass into the passageway, and a display device embedded in the golf ball dispenser;

at least one golf ball sensor;

one or more computers communicatively coupled with the at least one golf ball sensor and the golf ball dispensers, the one or more computers being configured to track the golf ball in flight on the golf range, identify where the golf ball lands on the golf range, identify the golf bay from which the golf ball was hit, and present information, regarding the golf ball hit from the golf bay, on the display device of the golf ball dispenser associated with the golf bay, the information being in accordance with where the golf ball lands on the golf range;

wherein the golf ball dispenser associated with the golf bay comprises:

a first camera arranged to capture a full swing of a first golf club in the golf bay; and a second camera arranged to capture a full swing of a second golf club in an adjacent golf bay.

20. The system of claim 19, wherein the golf ball dispenser comprises at least one outflow vent located so as to facilitate natural convection and release of heated air from within the golf ball dispenser.

21. The system of claim 20, wherein the golf ball dispenser comprises a waterproof, breathable fabric that allows air to pass out of the at least one outflow vent but prevents water from passing through the at least one outflow vent and into an interior of the golf ball dispenser.

22. The system of claim 19, wherein the golf ball dispenser comprises a blower or fan configured and arranged to direct air at the display device.

23. The system of claim 22, wherein the blower or fan is part of an assembly comprising a surface that is configured and arranged to shape the air into a curtain of air that passes between the display device and an impact resistant shield placed over the display device.

* * * * *